(12) United States Patent
Sasaki et al.

(10) Patent No.: US 6,184,910 B1
(45) Date of Patent: Feb. 6, 2001

(54) COLOR IMAGE FORMING APPARATUS WITH POLYGONAL MIRROR ROTATION PHASE CONTROL

(75) Inventors: Eiichi Sasaki, Sagamihara; Tsuyoshi Deki, Koshigaya; Nobuo Iwata, Sagamihara; Takeshi Motohashi, Kawasaki; Takahiro Tamiya, Tokyo; Yutaka Shio; Tomonori Yabuta, both of Tottori, all of (JP)

(73) Assignee: Ricoh Company, Ltd., Tokyo (JP)

( * ) Notice: Under 35 U.S.C. 154(b), the term of this patent shall be extended for 0 days.

(21) Appl. No.: 08/418,300

(22) Filed: Apr. 7, 1995

(30) Foreign Application Priority Data

Apr. 8, 1994 (JP) .................................... 6-070482
Apr. 20, 1994 (JP) .................................... 6-081821
Nov. 30, 1994 (JP) .................................... 6-296632

(51) Int. Cl.[7] .................................... B41J 2/385
(52) U.S. Cl. .................................... 347/116
(58) Field of Search .................................... 347/116, 248, 347/249, 234, 154, 103; 388/805, 812, 813, 820, 911; 318/801, 807, 809; 358/409, 411; 399/301, 302; 355/107

(56) References Cited

U.S. PATENT DOCUMENTS

| 4,910,532 | * | 3/1990 | Hiraguchi | 346/108 |
|---|---|---|---|---|
| 5,128,699 | * | 7/1992 | Nakajima et al. | 346/160 |
| 5,499,092 | * | 3/1996 | Sasaki | 347/116 |
| 5,640,645 | * | 6/1997 | Namekata et al. | 399/66 |
| 5,774,772 | * | 6/1998 | Kai et al. | 399/260 |
| 5,821,970 | * | 10/1998 | Sasaki et al. | 347/262 |
| 5,890,030 | * | 3/1999 | Namekata et al. | 399/66 |

FOREIGN PATENT DOCUMENTS

| 60-134274 | 7/1985 | (JP) . |
|---|---|---|
| 61-34162 | 2/1986 | (JP) . |
| 63-175817 | 7/1988 | (JP) . |
| 1-300280 | 12/1989 | (JP) . |
| 4-316063 | 11/1992 | (JP) . |
| 4-321067 | 11/1992 | (JP) . |
| 4-324885 | 11/1992 | (JP) . |
| 4-335665 | 11/1992 | (JP) . |

* cited by examiner

Primary Examiner—John Barlow
Assistant Examiner—C. Dickens
(74) Attorney, Agent, or Firm—Oblon, Spivak, McClelland, Maier & Neustadt, P.C.

(57) ABSTRACT

A color image forming apparatus capable of superposing toner images of respective colors in accurate register by preventing an exposing position from being displaced in the subscanning direction. The rotation phase of a polygonal mirror is controlled on the basis of the mark detection timing of a mark sensor. Hence, the exposing position in the subscanning direction is prevented from being displaced without regard to irregularities in the circumferential length and feed speed of an intermediate image transfer belt.

41 Claims, 33 Drawing Sheets

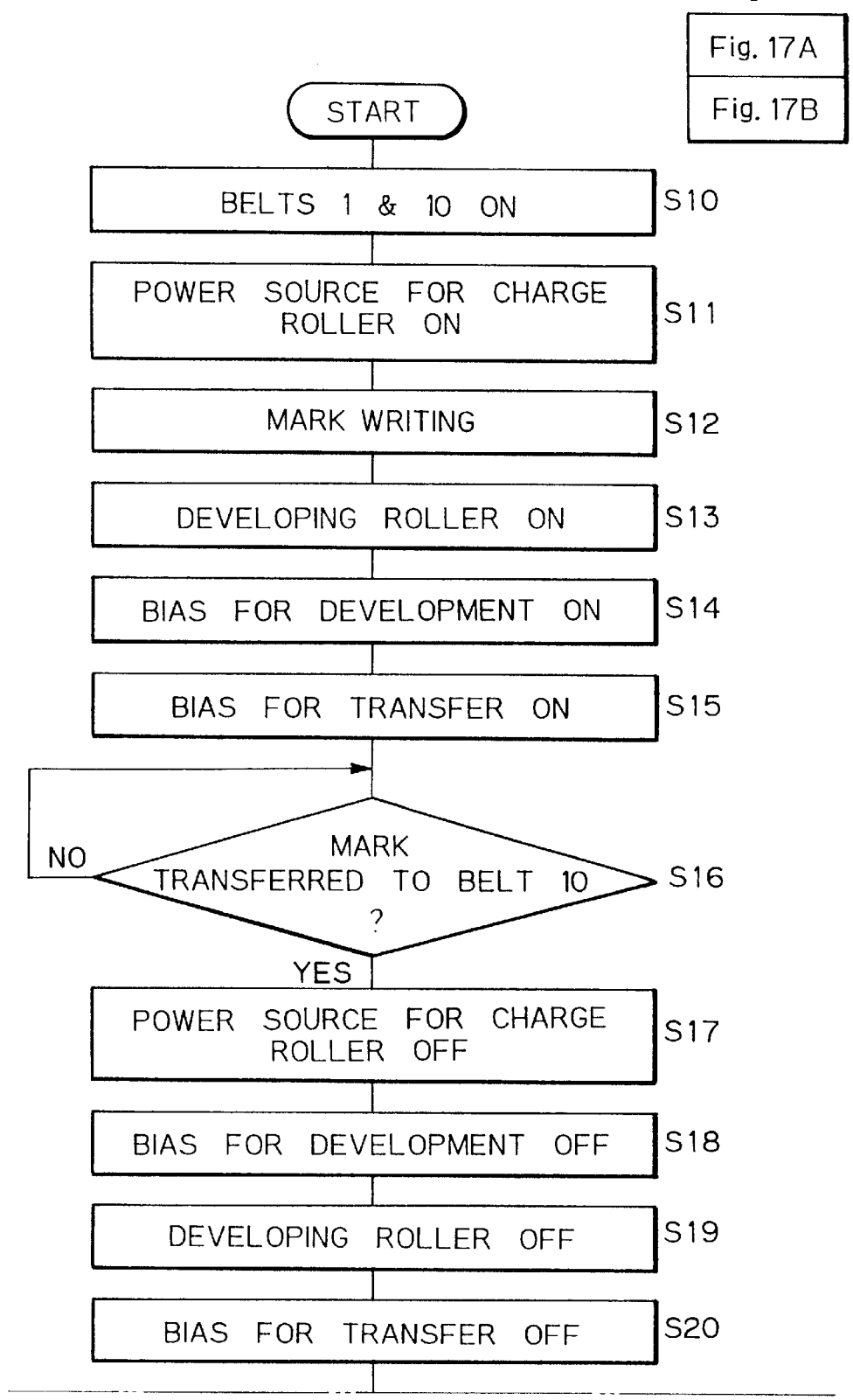

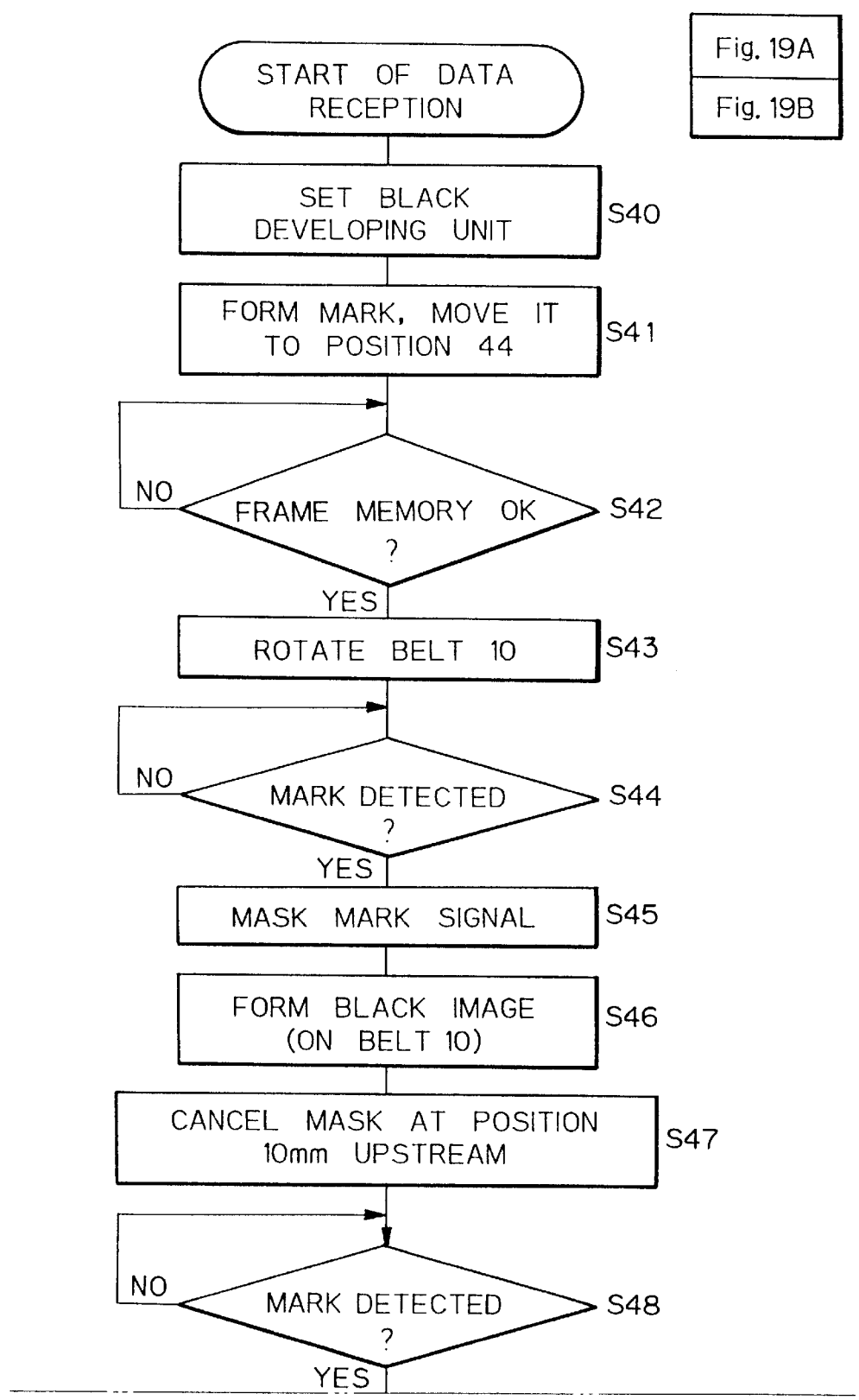

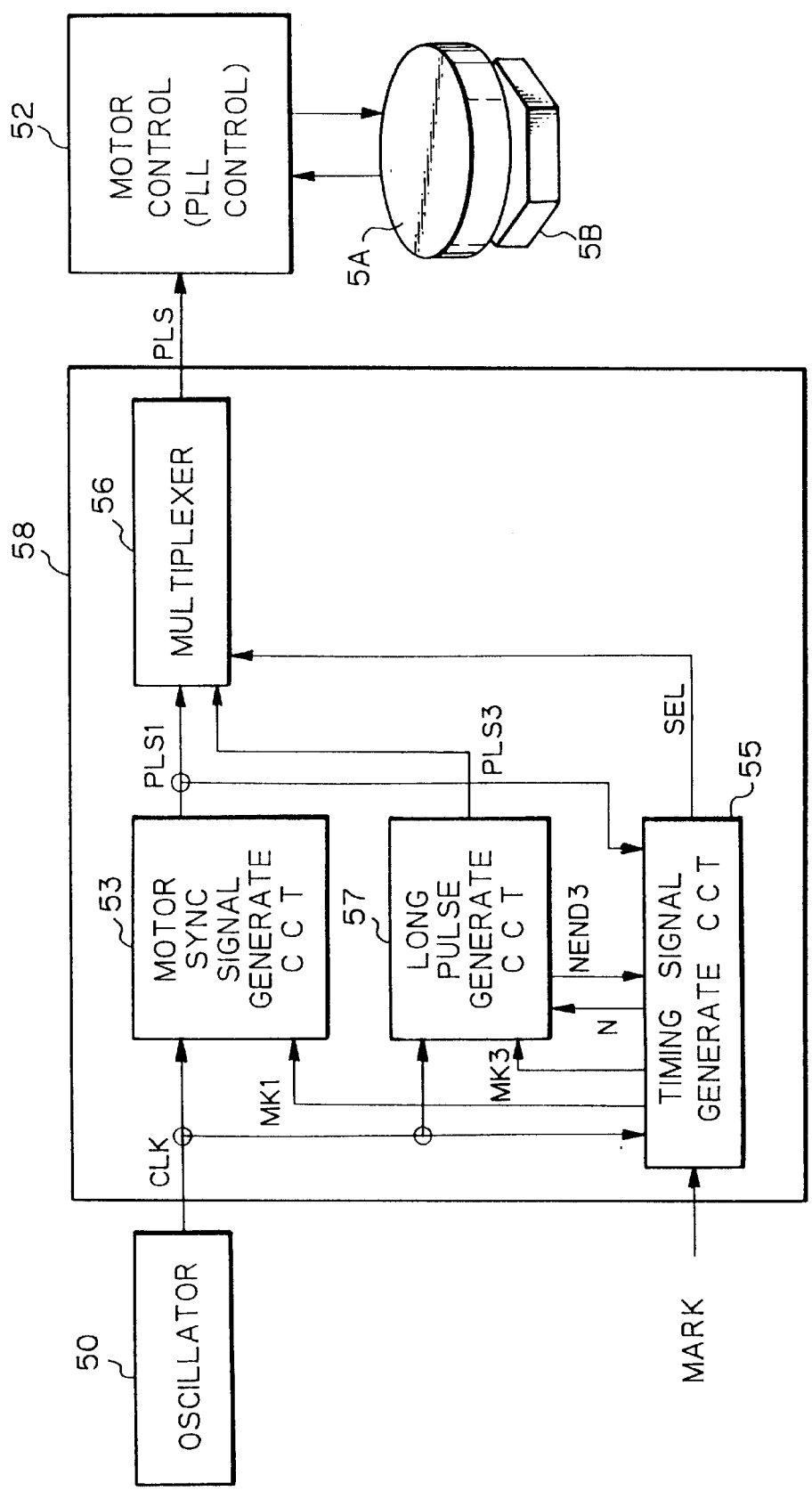

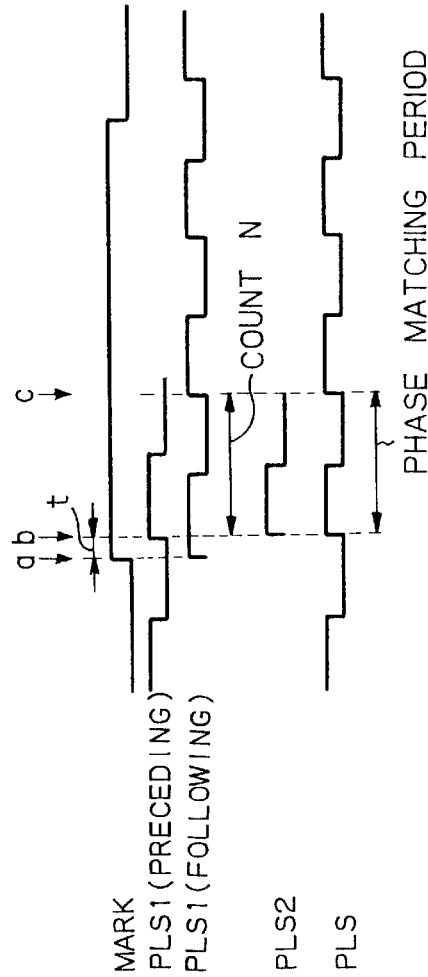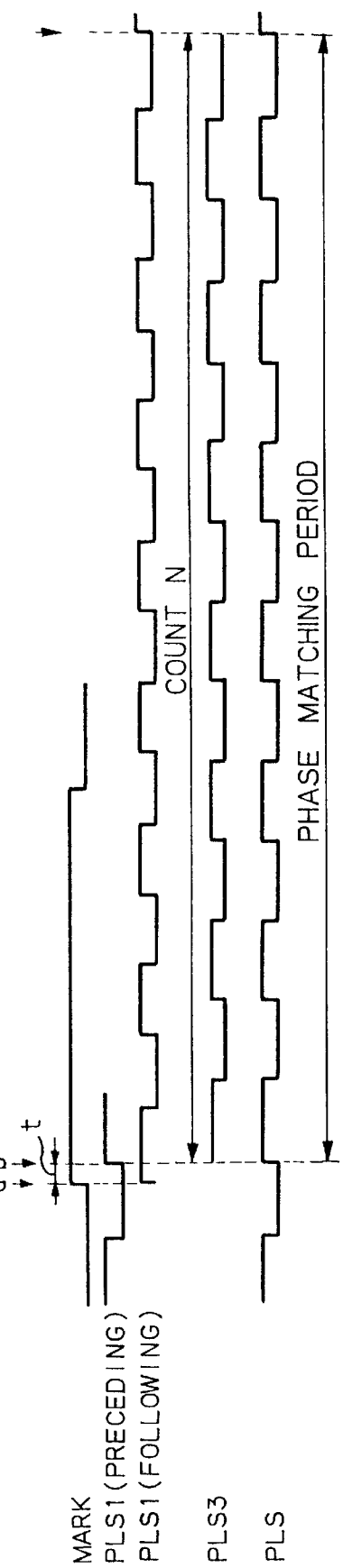

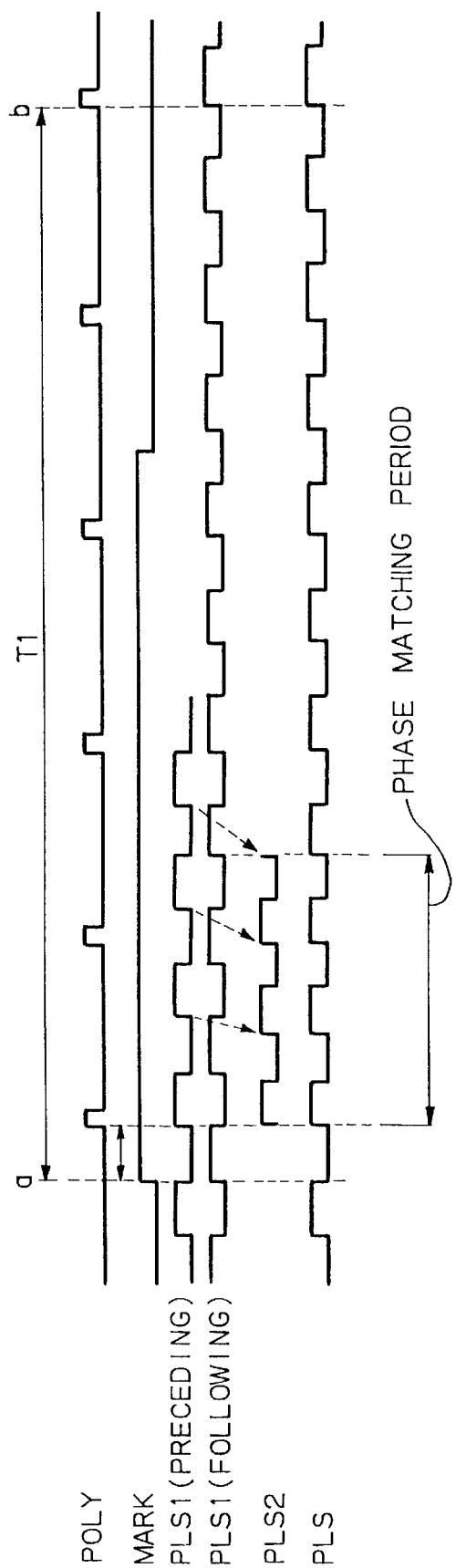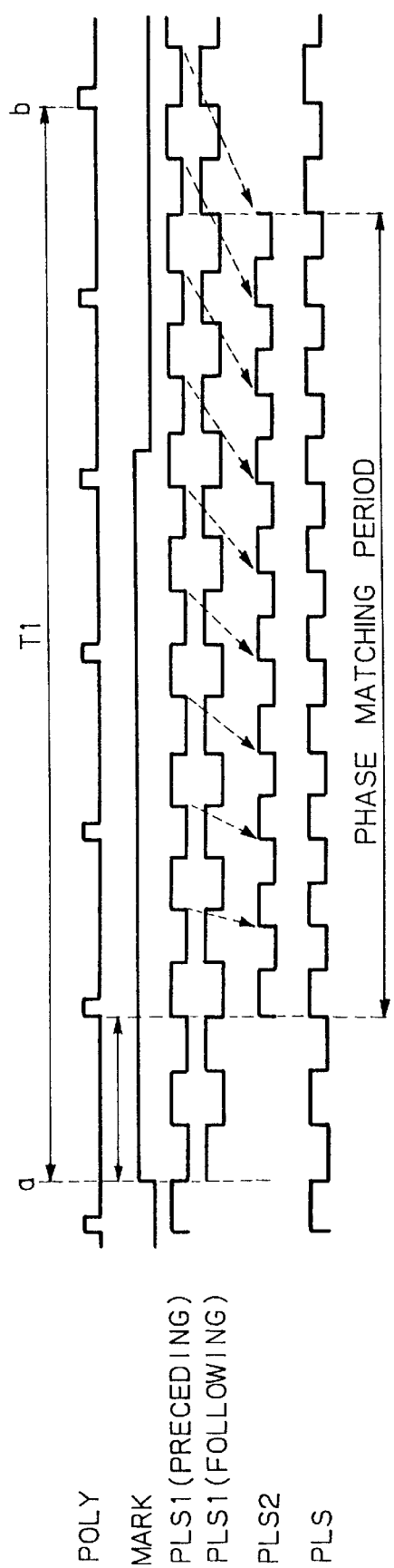

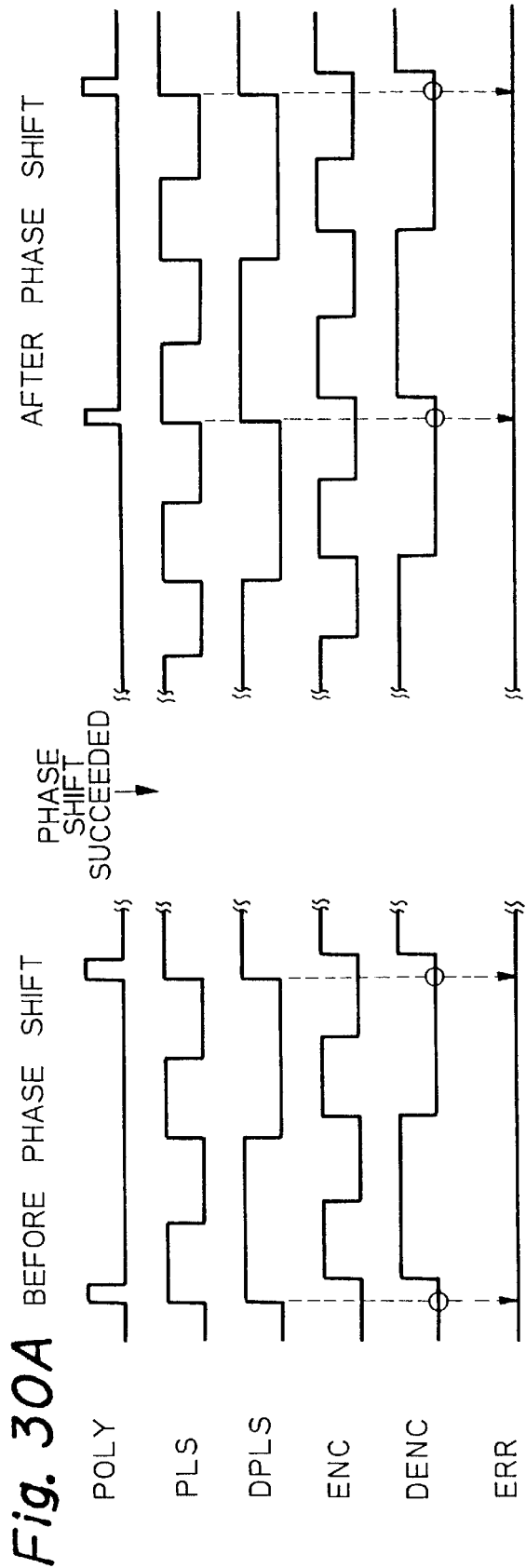
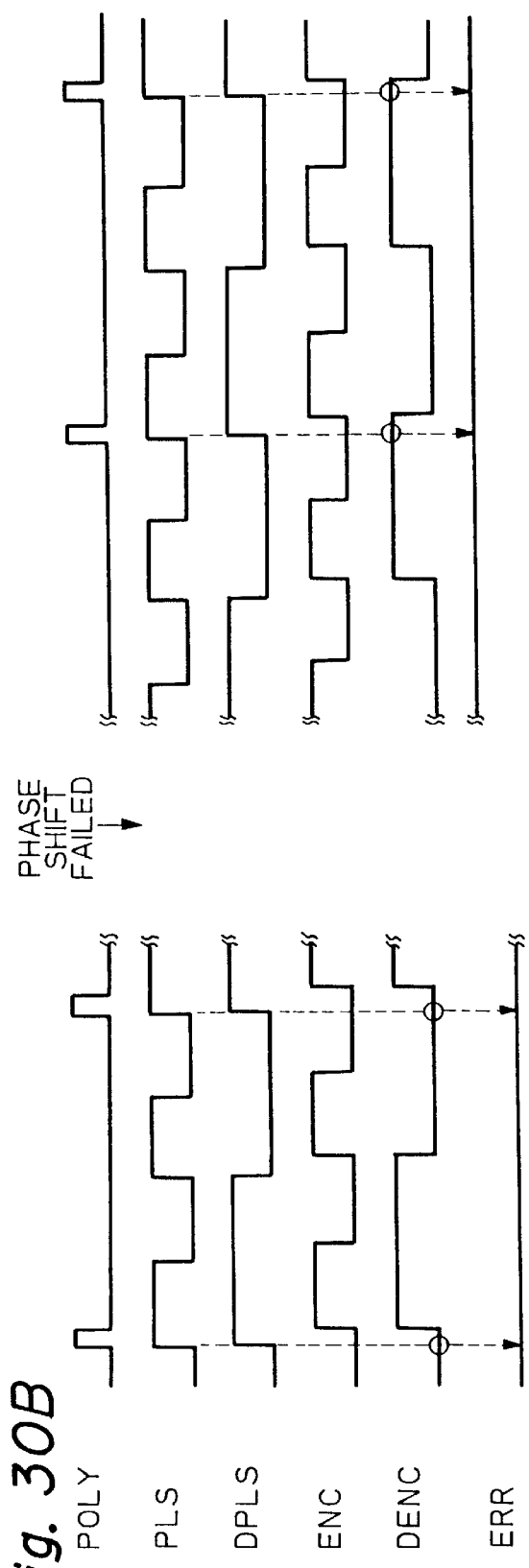
Fig. 30A BEFORE PHASE SHIFT / AFTER PHASE SHIFT — PHASE SHIFT SUCCEEDED
Fig. 30B BEFORE PHASE SHIFT / AFTER PHASE SHIFT — PHASE SHIFT FAILED

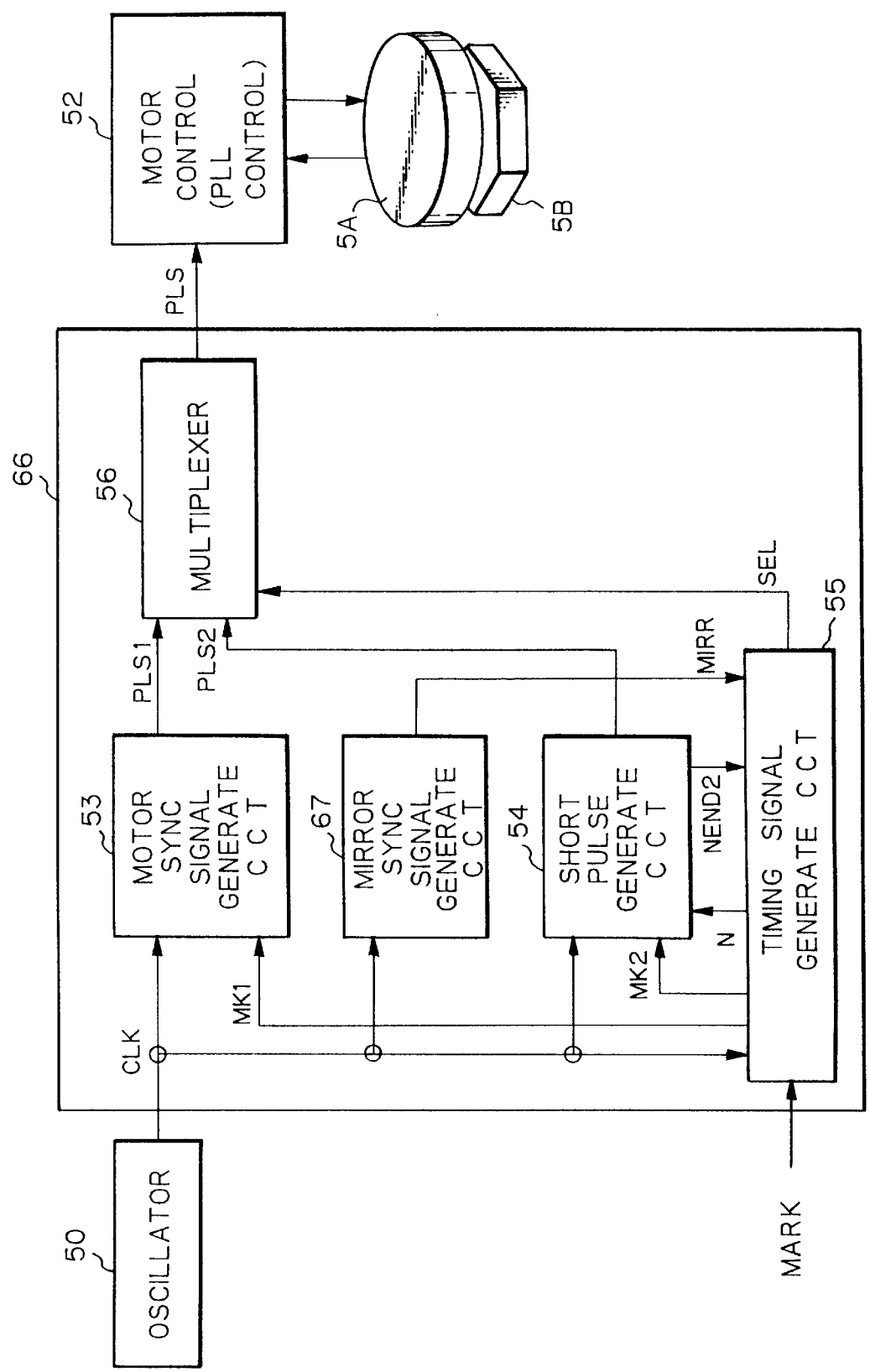

COLOR IMAGE FORMING APPARATUS WITH POLYGONAL MIRROR ROTATION PHASE CONTROL

BACKGROUND OF THE INVENTION

The present invention relates to a color copier, color printer, color facsimile apparatus or similar color image forming apparatus.

A color image forming apparatus of the type leaving a photoconductive belt and an intermediate image transfer belt is conventional. It has been customary with this type of apparatus to provide each belt with a mark or a notch and cause a photosensor or similar sensing member, mounted on the apparatus body, to sense it. This allows position information relating to the belt to be detected.

Japanese Patent Laid-Open Publication No. 4-335665, for example teaches a color image forming apparatus including a photoconductive belt provided with a triangular mark, and mark sensing means for sensing the mark with a laser beam. The mark sensing means senses the mark every time the belt is exposed by a light beam associated with an image forming signal of one color component. The rotation phase of a polygonal mirror and, therefore, the time for starting exposure in the subscanning direction is controlled on the basis of the time when the mark sensing means senses the mark. This kind of scheme is intended to produce a color image free from color displacement. The apparatus sequentially transfers toner images of different colors from the photoconductive belt to an intermediate image transfer belt one above the other, and then transfers the resulting composite image from the intermediate belt to a paper at a time. However, the monocolor images are necessarily displaced from each other because the circumferential length of the intermediate belt and the scanning interval of the polygonal mirror do not have an integral multiple relation Theoretically, therefore, one line of displacement occurs between the consecutive monocolor toner images.

Japanese Patent Laid-Open Publication No. 61-34162 discloses an arrangement wherein a mark for sensing the seam of a photoconductive belt is formed on the belt by the thermal transfer of ink from a thermally fusible ink layer. However, the thermal transfer method is practicable only with limited substances. For example, an intermediate image transfer member made of fluorine-contained resin, e.g., ETFE does not allow the ink to be transferred thereto because it has a non-adhesive surface. Moreover, even when the belt allows the ink to be transferred thereto, the transfer at high temperature is likely to affect the property of the belt.

Further, Japanese Patent Laid-Open Publication No. 60-134274 proposes a photoconductive belt formed with notches for timing detection at opposite edges thereof. The photoconductive belt, having a base made of PET (polyethylene telephthalate), scarcely cracks at the notches or otherwise deteriorates despite the notches. However, the intermediate belt, made of ETFE or similar fluorine-contained resin, would crack at the notches during the course of repeated rotation. Specifically, because the mechanical strength depends on the material, the notch scheme is limited by the material of the belt and not suitable for the intermediate belt.

The intermediate belt made of ETFE exhibits a far more noticeable non-adhesion characteristic than belts made of the other materials. Therefore, it is difficult to form a mark on the ETFE belt by hot stamping, painting, printing or similar technology. Although the mark itself may be adhered to the belt by, for example a two-sided adhesive tape, it is likely that the mark is turned up and disturbs the operation of a photosensor or similar sensing means. In an color image forming apparatus of the type using such an intermediate belt and controlling the registration of colors on the basis of a mark provided on the belt, the contamination, turn-up and other disfigurement of the belt cause the colors to b e displaced from each other and results in irregular colors.

SUMMARY OF THE INVENTION

It is, therefore, an object of the present invention to provide a color image forming apparatus capable of accurately superposing toner images of respective colors by obviating the displacement of an exposing position in the subscanning direction.

It is another object of the present invention to provide a color image forming apparatus having a photoconductive belt or an intermediate image transfer belt to which a position mark can be surely fitted.

It is another object of the present invention to provide a color image forming apparatus which allows a position mark to be simply and firmly affixed to a photoconductive belt or an intermediate image transfer belt.

A color image forming apparatus of the present invention has an image carrier for causing a latent image to be electrostatically formed thereon, a light emitting device for emitting a light beam modulated by each of image signals of respective colors and representative of a document image, a rotatable polygonal mirror for steering the light beam to thereby electrostatically form latent images respectively associated with the image signals on the image carrier, a drive source for causing the polygonal mirror to rotate, a developing device for developing the latent images with developers of respective colors to thereby produce corresponding monocolor toner images, an intermediate transfer body formed with a mark for position detection, and for causing the monocolor toner images to be sequentially transferred thereto from the image carrier, a sensor located at a predetermined position for sensing the mark, a first controller for causing each of the latent images to begin to be formed on the basis of the time when the sensor senses the mark, and a second controller for controlling the rotation phase of the polygonal mirror on the basis of the time when the sensor senses the mark.

BRIEF DESCRIPTION OF THE DRAWINGS

The above and other objects, features and advantages of the present invention will become apparent from the following detailed description taken with the accompanying drawings in which:

FIG. 20 is a block diagram schematically showing a phase matching section and a control section representative of a fifth embodiment of the present invention;

FIGS. 25A and 25B are timing charts showing the operation of the phase matching section and control section of FIG. 24;

FIGS. 28A and 28B are timing charts demonstrating a phase control procedure particular to a ninth embodiment of the present invention;

FIGS. 30A and 30B are timing charts showing the operation of the tenth embodiment;

FIG. 31 is a block diagram schematically showing a phase matching section and a control section representative of an eleventh embodiment of the present invention;

DESCRIPTION OF THE PREFERRED EMBODIMENTS

Figure 1:
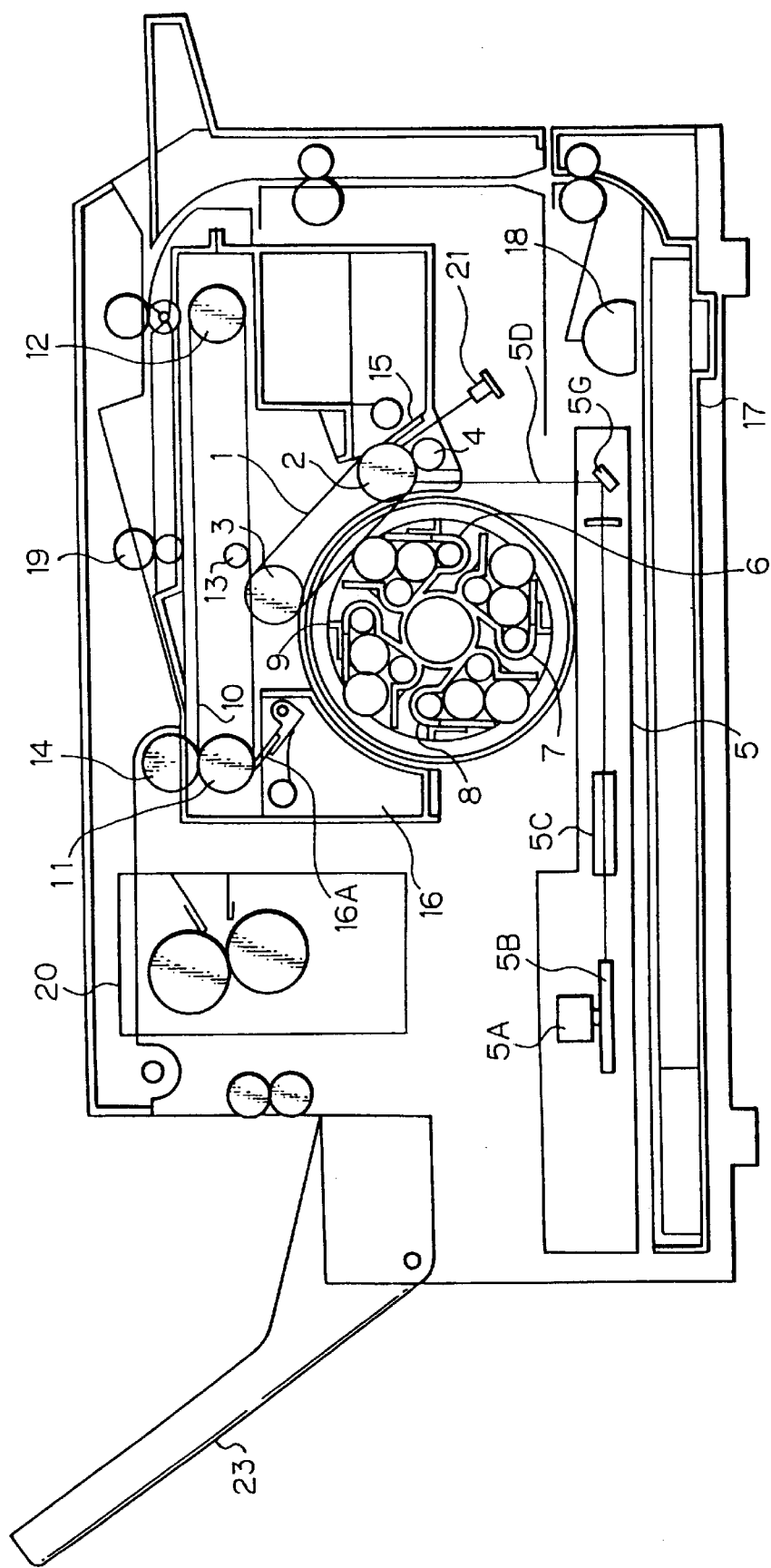
FIG. 1 is a section of a color image forming apparatus to which preferred embodiments of the present invention are applied.

Preferred embodiments of the color image forming apparatus in accordance with the present invention will be described hereinafter with reference to the accompanying drawings. In the embodiments, the same or similar constituent parts are designated by the same reference numerals, and a repetitive description thereof will not be made. A color image forming apparatus to which the embodiments are applied will be described first.

Referring to FIG. 1 of the drawings, a color image forming apparatus includes a photoconductive element, or image carrier, implemented as a belt 1. The belt 1 is passed over a drive roller 2 and a driven roller 3 and driven by the roller 2 to rotate clockwise (subscanning direction). There are also shown in the figure a charge member 4, a laser writing unit or exposing means 5, and a plurality of developing units or developing means 6, 7, 8 and 9, and an intermediate transfer body 10. The charge member 4 is comprised of a charge roller. The developing units 6–9 are constructed into a single revolver, and each stores a developer of particular color The intermediate transfer body 10 is implemented as a belt 10 passed over rollers 11 and 12 and driven by one of them to rotate counterclockwise.

The laser writing unit 5 is received in a casing which is formed with a slit in the top thereof and mounted to the apparatus body. The charge roller and writing unit 5 constitute latent image forming means in combination. The writing unit 5 shown in the figure may be replaced with optics having a light emitting section and a converging light transmitting body constructed into a unit. The charge member 4 and part of the writing unit 5 for issuing a laser beam 5D onto the photoconductive belt 1 are located in close proximity to the drive roller 2 over which the belt 1 is passed. The developing units 6–9 respectively store developers containing, for example, yellow toner, magenta toner, cyan toner, and black toner. The developing units 6–9 each includes a developing sleeve adjoining or contacting the belt 1 at a predetermined position. A latent image electrostatically formed on the belt 1 is developed by any one of the developing units 6–9 by non-contact development or contact development.

The photoconductive belt 1 and intermediate belt 10 contact each other at the position where the driven roller 3 is located. A bias roller 13 is held in contact with the inner periphery of the belt 10. When a bias for image transfer is applied from a high-tension power source, not shown, to the bias roller 13, the first monocolor image formed on the belt 1 is transferred from the belt 1 to the belt 10. Likewise, the second to fourth monocolor images arc sequentially transferred from the belt 1 to the belt 10 one above the other in accurate register.

A transfer roller 14 is driven by a moving mechanism into and out of contact with the intermediate belt 10. Cleaning devices 15 and 16 clean the belts 1 and 10, respectively. A blade 16A is included in the cleaning device 16 and spaced apart from the surface of the belt 10 during the course of image formation. Only when the belt 10 should be cleaned after image transfer, the blade 16A is pressed against the belt 10, as shown in FIG. 1.

A color image forming process particular to the apparatus is as follows. First, a multicolor image is formed by the following image forming system. An image reading device scans a document image and reads it with an imaging device. The resulting color image data are processed by an processing section to turn out yellow, magenta, cyan and black image data. These image data are written to an image memory. At the time of recording, the image data are sequentially read out of the image memory and transferred to the writing unit 5 as image forming signals of respective colors. Specifically, the image data of respective colors from the image reading device, which is physically separate from the image forming apparatus, are sequentially delivered to the writing unit 5.

In the writing unit 5, a motor or driving device 5A causes a polygonal mirror 5B to rotate. A laser driver, not shown, drives a semiconductor laser 5E, not shown, in response to the image data of respective colors sequentially input from the image reading device. As a result, the laser 5E issues a laser beam whose intensity changes in accordance with the image data. The laser beam is steered by the mirror 5B which is in rotation. The laser beam from the mirror 5B is routed through an f-theta lens 5C and a mirror 5G to the surface of the photoconductive belt 1. The belt 1 is discharged by a discharge lamp 21 and then uniformly charged by the charge roller 4 beforehand. The laser beam 5D from the mirror 5G scans the charged surface of the belt 1 so as to sequentially form latent images each corresponding to one of the image forming signals. Specifically, a bias is applied from a power source, not shown, to the charge roller 4 for uniformly charging the surface of the belt 1. The image patterns with which the writing unit 5 exposes the belt 1 are the yellow, magenta, cyan and black patterns derived from a desired full-color document image.

The latent images sequentially formed on the belt 1 are respectively developed by the yellow, magenta, cyan and black developing units 6–9. As a result, the latent images each turns out a toner image of corresponding color. When the latent image corresponding to the yellow image signal is formed on the belt 1, the revolver, containing the developing units 6–9, is rotated to bring the unit 6 to a developing position. At this position, the developing unit 6 develops the latent image to produce a yellow toner image. The other developing units 7, 8 and 9 are operated in the same manner as the developing unit 6 in order to develop the latent images corresponding to the magenta, cyan and black image signals, respectively. As a result, a magenta toner image, cyan toner image and black toner image are sequentially formed on the belt 1.

The bias applied to the bias roller 13 from the high-tension power source is transferred to the intermediate belt 10. The yellow, magenta, cyan and black toner images sequentially formed on the belt 1 are sequentially transferred from the belt 1 to the belt 10 one above the other, thereby forming a full-color image on the belt 10. A paper is fed out from a cassette 17 by a pick-up roller 18 and conveyed via a registration roller 19 to an image transfer position where the transfer roller 14 is located. The transfer roller 14 transfers the full-color image from the belt 10 to the paper. After the toner image has been fixed on the paper by a fixing unit 20, the paper is driven out to a tray 23.

The belts 1 and 10 are seamless. After the yellow, magenta, cyan and black toner images have been transferred from the belt 1 to the belt 10, the belt 1 is cleaned by the cleaning unit 15. The belt 10 is cleaned by the cleaning unit 16 after the full-color image has been transferred from the belt 10 to the paper.

1st Embodiment

Figure 2:
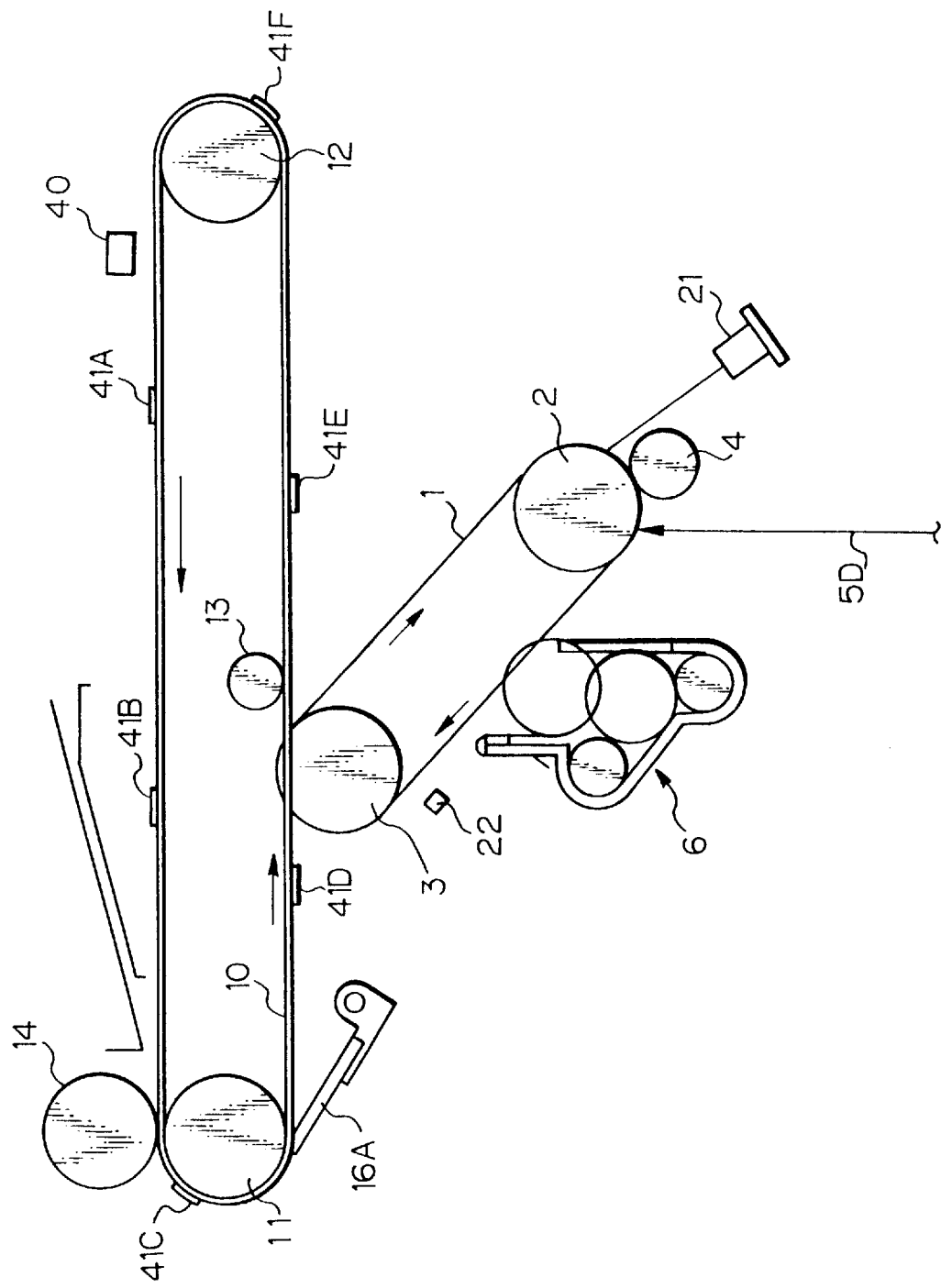
FIG. 2 is a fragmentary section showing a first embodiment of the color image forming apparatus in accordance with the present invention.

Referring to FIG. 2, a first embodiment of the present invention applied to the apparatus of FIG. 1 will be described. As shown, six marks 41A–41F are provided on one edge of the intermediate belt 10 at equally spaced locations. A mark sensor, or sensing means, 40 senses the marks 41kA–41F at a position downstream of the roller 12 with respect to the direction of rotation of the belt 10. The mark sensor 40 is implemented by a reflection type photosensor constituted by a reflection type photointerrupter.

When the mark sensor 40 senses one of the marks 41A–41F, e.g., mark 41A, the writing unit 5 starts writing an image of the first color corresponding to the yellow image signal. When the mark sensor 40 again senses the mark 41A after one turn, the writing unit 5 starts writing an image of the second color corresponding to the magenta image signal. At this instant, the outputs of the mark sensor 40 representative of the other marks 41B–41F are masked in order to prevent them from being used as image writing timings. This can be done due to the control over the number of marks. A photosensor 22 faces part of the belt 1 upstream, with respect to the direction of rotation of the belt 1, of a position where the belt 1 contacts the belt 10. The photosensor 22 is responsive to the amount of toner deposited on the belt 1.

Figure 3:
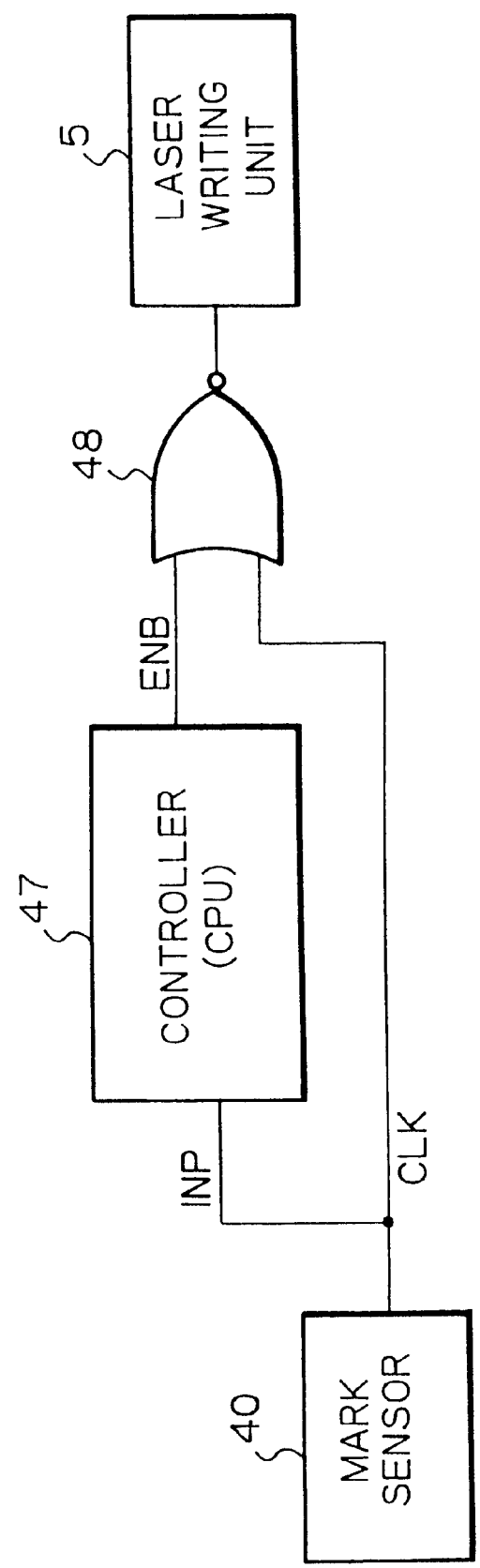
FIG. 3 is a block diagram schematically showing a position information detecting section included in the first embodiment.

FIG. 3 schematically shows a position information detecting section included in the illustrative embodiment. As shown, the mark signal from the mark sensor 40 is input to an interrupt terminal included in a controller 47. The controller 47 is comprised of a CPU (Central Processing Unit), i.e., a microcomputer with a CPU. Specifically, the mark signal serves as a clock signal INP for a down-counter which is built in the CPU 47 to count the mark signals from the mark sensor 40. When the down-counter counts a predetermined number of mark signals, i.e., when a predetermined period of time expires after the sensor 40 has sensed the mark 41A, the down-counter reaches zero. Then, the CPU 47 delivers to a NOR gate 48 a write enable signal ENB for causing the writing unit 5 to start writing an image. At the same time, the NOR gate 48 gates the mark signal from the mark sensor 40 and meant for the writing unit 5. The output of the NOR gate 48 is sent to the writing unit 5 as a write start signal.

Figure 4:
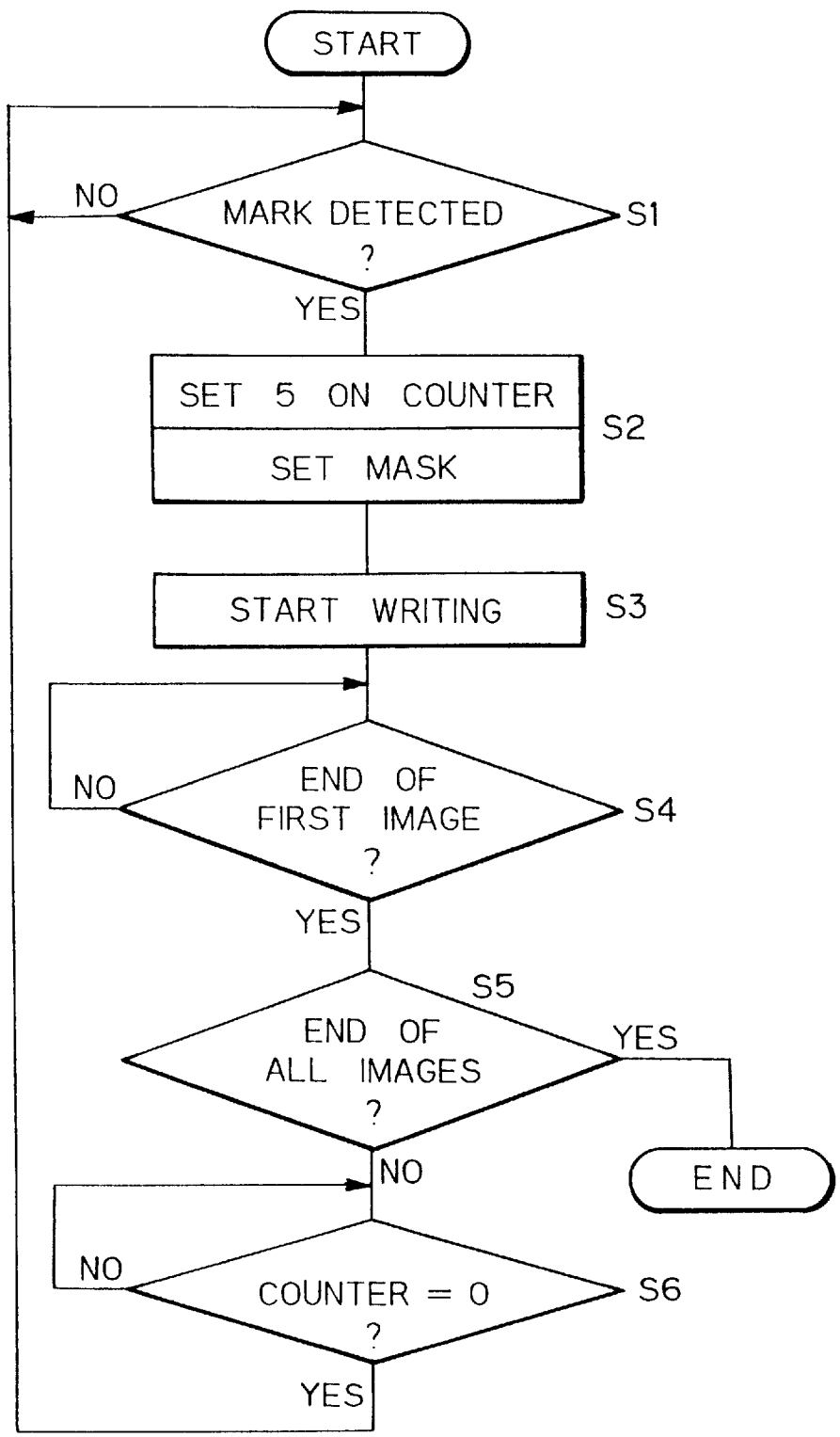
FIG. 4 is a flowchart demonstrating the operation of the first embodiment.

A position information detection procedure particular to the embodiment is shown in FIG. 4. As shown, when printing is enabled, the CPU 47 references the input signal INP to see if the mark sensor 40 has sensed the first mark 41A or not (step S1). If the answer of the step S1 is NO, the CPU 47 returns to the step S1 and repeats it until the mark sensor 40 senses the mark 41A. Of course, the CPU 47 provides the write enable signal with an enabled state or "L (low level)" before the mark sensor 40 senses the mark 41 A. When the mark sensor 40 senses the mark 41A, the CPU 47 sets a count "5" on the down-counter and provides the write enable signal ENB with a mask enable state "H (high level)" (step S2). In this condition, a write start signal is sent from the NOR gate 48 to the writing unit 5 (step S3).

The CPU 47 determines whether or not a toner image of the first color has been formed (step S4). If the answer of the step S4 is NO, the CPU 47 repeats the step S4. When the answer of the step S4 changes to YES, the CPU 47 executes a step S5 for determining whether or not all the constituent toner images have been formed. If the answer of the step S5 is YES, the CPU 47 ends the position information detection procedure. If the answer of the step S5 is NO, the CPU 47 sees if the down-counter has reached "0" (step S6). If the answer of the step S6 is NO, the CPU 47 repeats the step S6.

When the answer of the step S6 changes to YES, the CPU 47 returns to the step S1. As a result, every time the mark sensor 40 senses the mark 41A, the writing unit 5 starts on exposure with image data of one color.

Figure 5:
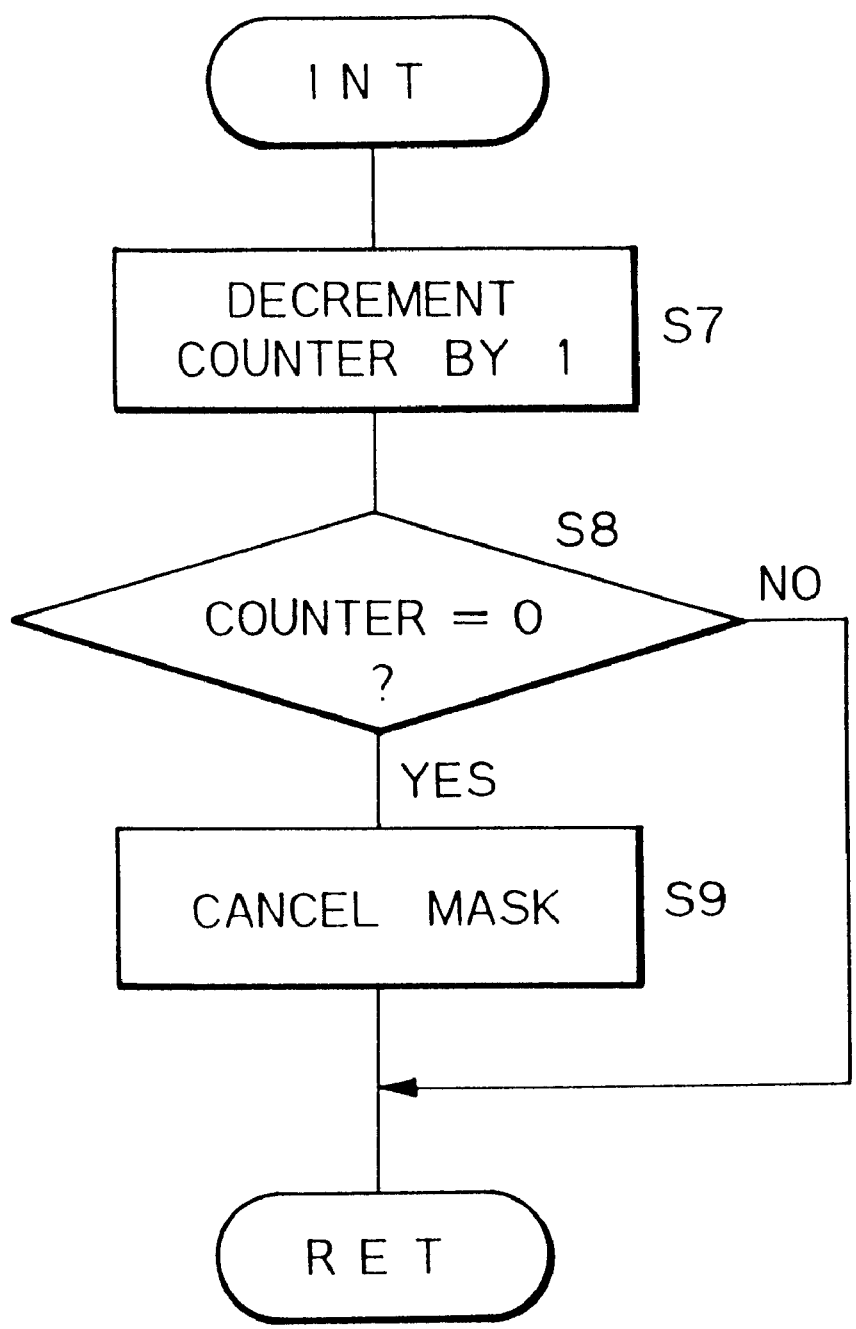
FIG. 5 is a flowchart showing an interrupt routine particular to the first embodiment.

FIG. 5 shows an interrupt routine in which the CPU 47 determines whether or not an image of one color has been formed by referencing the count of the down-counter. The interrupt routine to be described is executed with priority when the mark signal from the mark sensor 40 changes from "L" to "H" during the course of the routine shown in FIG. 4.

After the interrupt routine, the CPU 47 returns to the step of FIG. 4 from which it has jumped to the interrupt routine. As shown in FIG. 5, the CPU 47 decrements the down-counter by 1 (one) every time the mark sensor 40 senses one of the marks 41A–41F (step S7). The CPU 47 determines whether or not the down-counter has reached "0" (step S8). If the answer of the step S8 is NO, the CPU 47 ends the interrupt routine. If it is YES, the CPU 47 resets the mask state for thereby changing the write enable signal ENB to "L", and then ends the interrupt routine.

Figure 6:
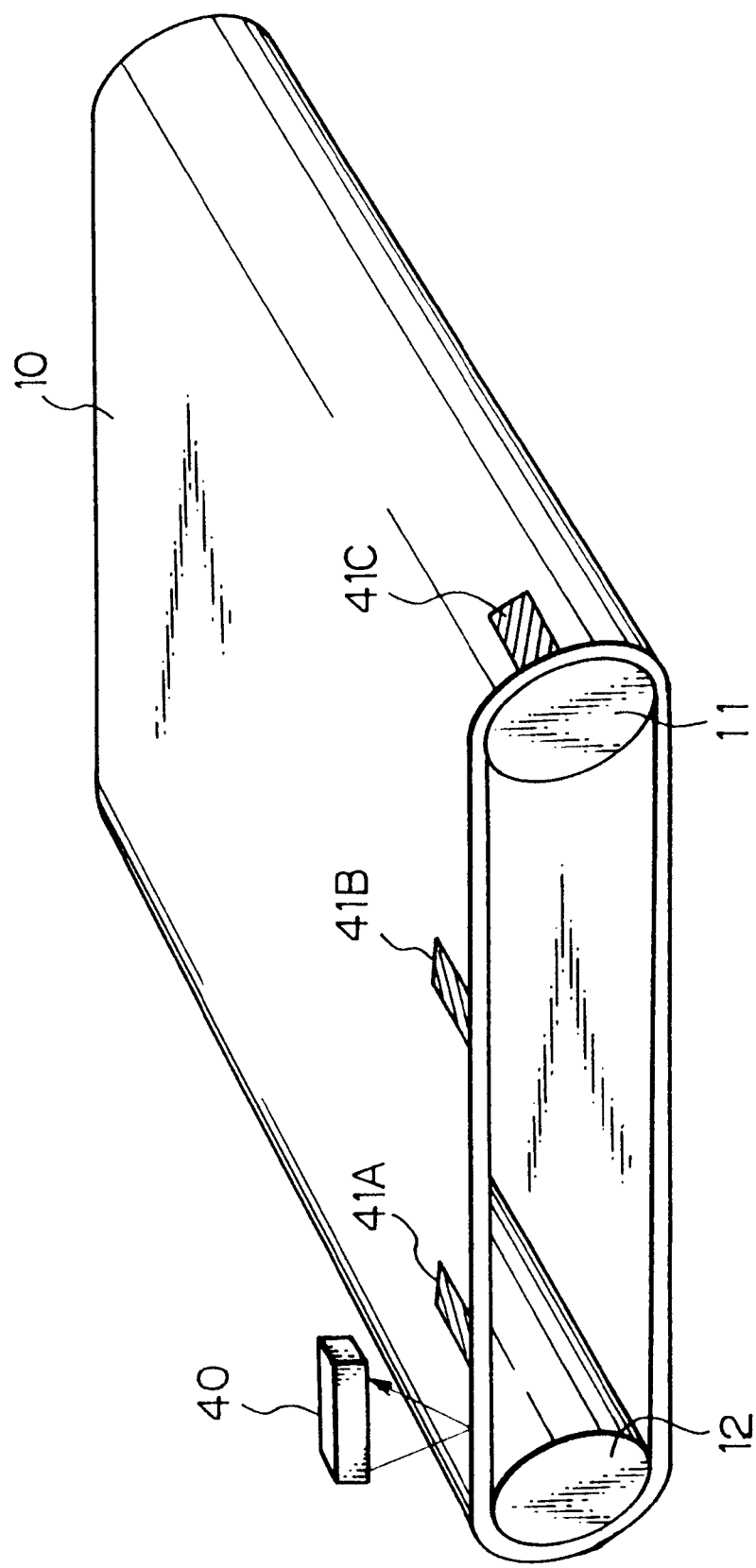
FIG. 6 is a perspective view of a mark sensor included in the first embodiment.

FIG. 6 shows the marks 41A–41C and mark sensor 40 specifically. As shown, white marks are printed on one edge of the intermediate belt 10 to serve as the marks 41A–41F.

While the marks 41A–41F should be substantially equally spaced from each other, their accuracy may be relatively low.

The mark sensor 40 is located in the vicinity of the part of the belt 10 contacting the roller 12. The mark sensor 40 senses the marks 41A–41F by emitting light toward the belt 10 and receiving a reflection from the belt 10.

Figure 7:
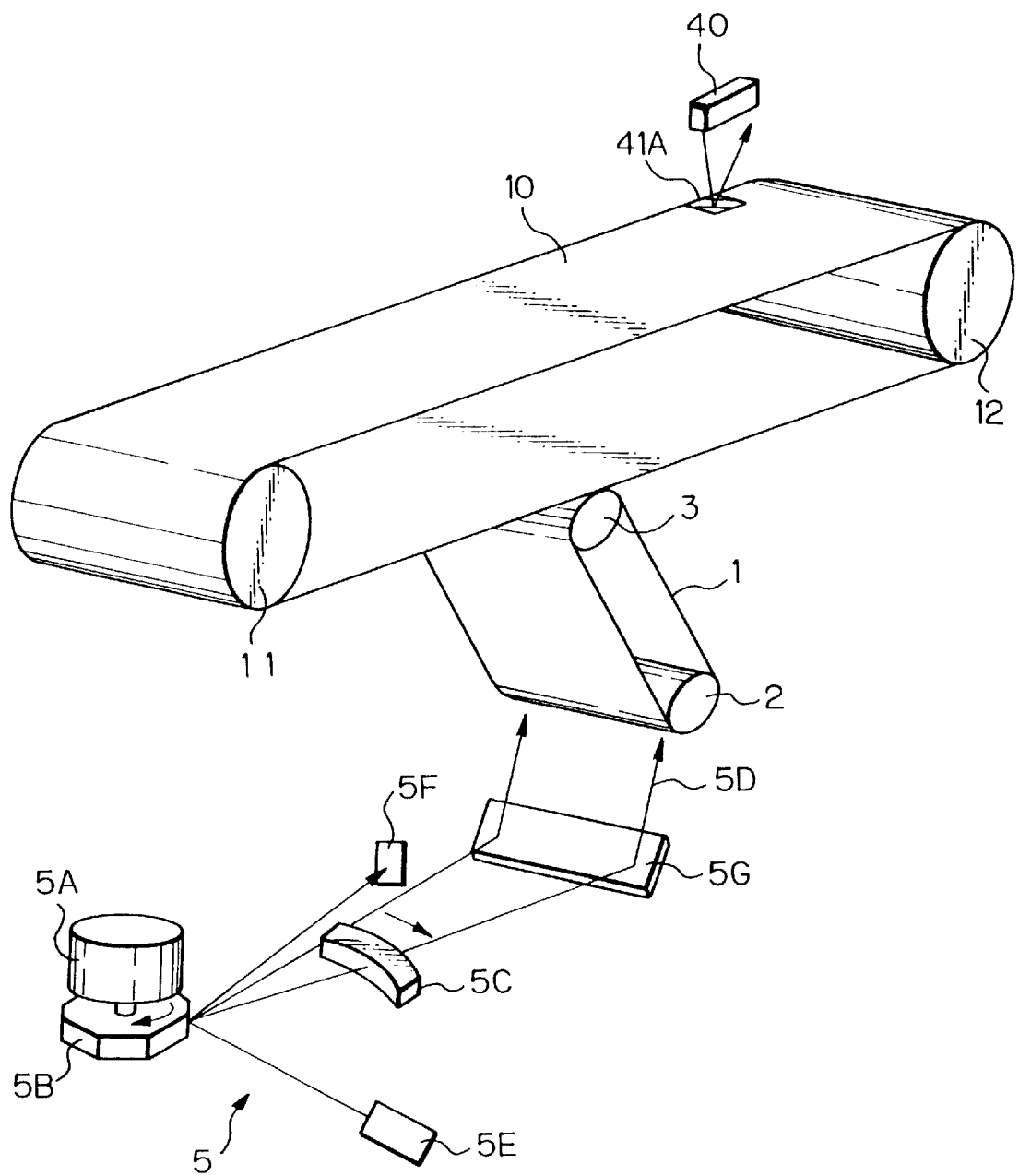
FIG. 7 is a perspective view of an arrangement extending from a laser writing unit to the mark sensor and included in the first embodiment.

FIG. 7 shows the general arrangement extending from the writing unit 5 to the mark sensor 40. The image reading unit, separate from the image forming apparatus, delivers a color signal to the writing unit 5. In response, the laser driver of the unit 5 drives the laser 5E in accordance with the color signal. As a result, the laser 5E emits a laser beam whose intensity matches the color signal. The motor 5A rotates the polygonal mirror 5B. The mirror 5B, therefore, steers the laser beam incident thereto in the main scanning direction. The beam from the mirror 5B is incident to the belt 1 via the f-theta lens 5C and mirror 5G. Before the beam from the mirror 5B is incident to the belt 1, it is sensed by a beam sensor 5F for synchronization. The resulting output of the beam sensor 5F is used as a synchronizing signal for image writing and assigned to the main scanning direction. The motor 5A rotates in synchronizing with a motor synchronizing signal. The motor synchronizing signal has a phase synchronous to the rotation phase of the motor 5A. The mirror 5B has eight faces. The motor synchronizing signal has two pulses for one rotation of the mirror 5B.

Figure 8:
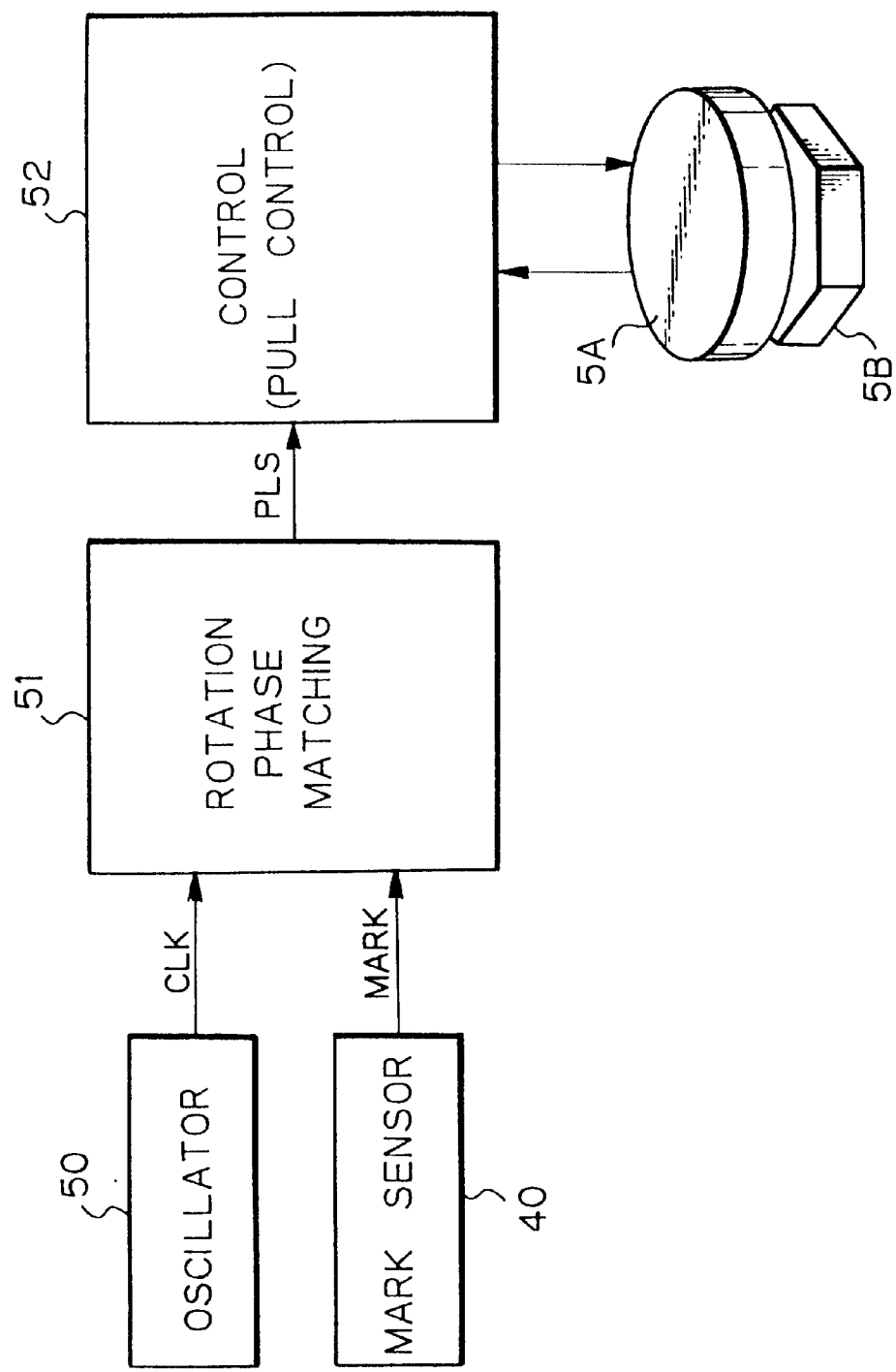
FIG. 8 is a block diagram schematically showing a phase matching section and a control section included in the first embodiment and assigned to a polygonal motor.

FIG. 8 schematically shows a rotation phase matching section 51 and a motor control section 52 assigned to the motor 5A. As shown, the rotation phase matching section 51 receives the mark signal MARK from the mark sensor 40 and a clock CLK from an oscillator 50. The matching section 51 divides the frequency of the clock CLK and delivers the resulting signal to the motor control section 52 as a motor synchronizing signal PLS. In response, the control section 52 synchronously controls the speed and phase of rotation of the motor 5A. In the illustrative embodiment, the matching section 51 divides the frequency of the clock CLK by 64. Specifically, assuming that the clock period of the oscillator 50 is tc, the motor synchronizing signal PLS has a period of tp=64*tc. The matching section 51, triggered by the leading edge of the mark signal from the mark sensor 40, changes the phase of the signal PLS so as to again set the rotation phase of the motor 5A.

Figure 9:
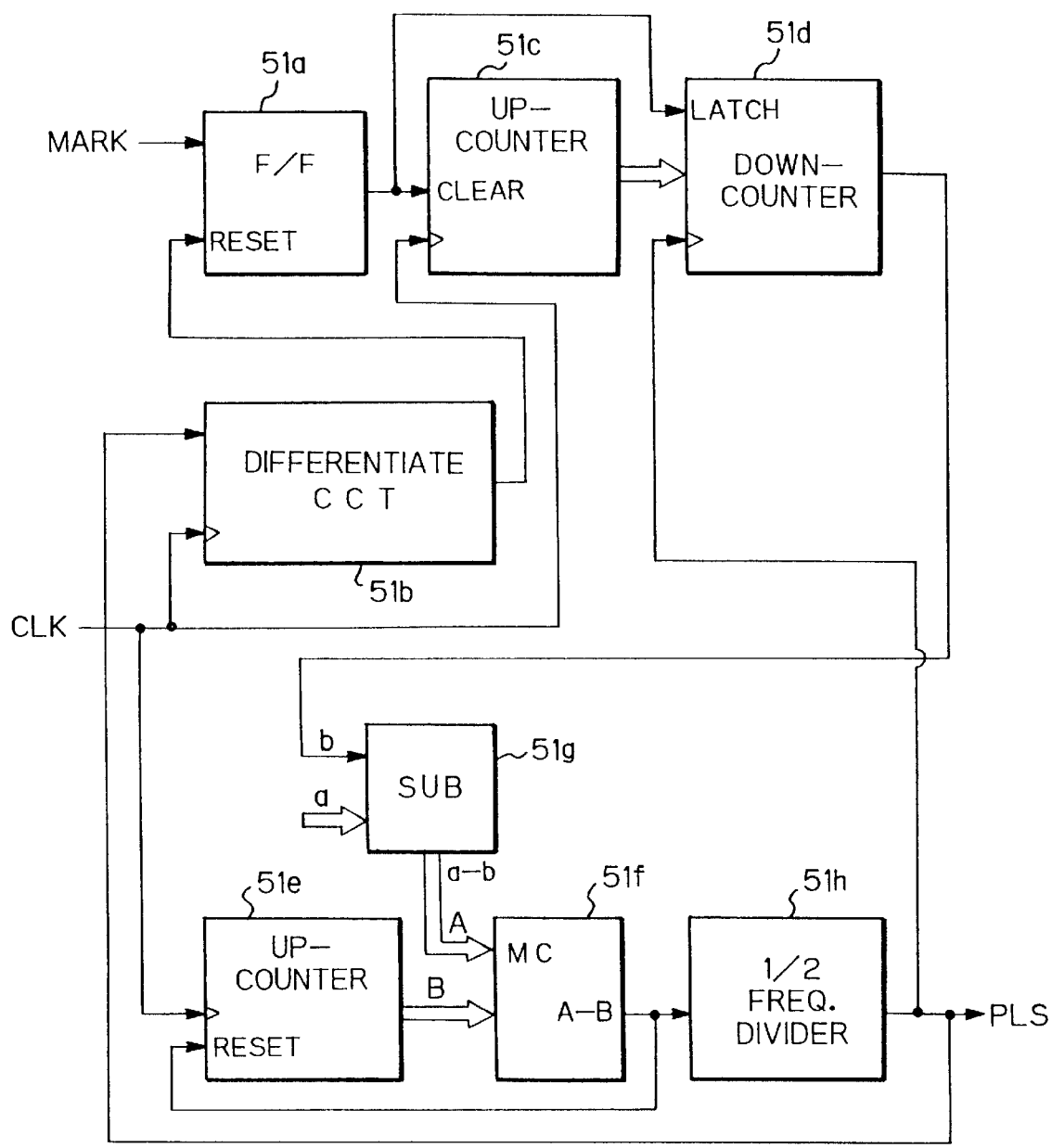
FIG. 9 is a block diagram schematically showing the phase matching section specifically.

Referring to FIG. 9, a specific construction of the matching section 51 is shown. As shown, the mark signal MARK from the mark sensor 40 is input to a flip-flop (F/F) 51a. The F/F 51a is set by the mark signal MARK or reset by a reset signal from a differentiating circuit 51b. The output of the F/F 51a goes high when the F/F 51a is set or goes low when it is reset. The differentiating circuit 51b receives the motor synchronizing signal PLS from a ½ frequency divider 51h. At the leading edge of the signal PLS, the differentiating circuit 51b outputs one pulse of the clock CLK from the oscillator 50. The output of the F/F 51a is fed to the clear terminal of an up-counter 51c. When the output of the F/F 51a goes low, the output of the up-counter 51c becomes "0". When the F/F output goes high, the up-counter 51c starts counts up the clock CLK from the oscillator 50. More specifically, the up-counter 51c starts operating at the leading edge of the mark signal MARK and then sops operating at the leading edge of the motor synchronizing signal PLS to become "0". The last count of the up-counter 51c is latched by a down-counter 51d at the trailing edge of the output of the F/F 51a. The down-counter 51d operates in response to a clock which is implemented by the signal PLS from the ½ frequency divider 51h. On reaching "0", the down-counter 51d stops operating when the count reaches "0", and remains in the inoperative state until it again latches the last count of the up-counter 51c.

An up-counter 51e, a subtractor (SUB) 51g, a magnitude comparator (MC) 51f, and the ½ frequency divider 51h generate the motor synchronizing signal PLS. A signal b fed from the down-counter 51d to the SUB 51g is usually "0". When a set value is input to the SUB 51g as another input signal a, the SUB 51g produces a difference a–h and delivers it to the MC 51f. The up-counter 51e counts up the clock from the oscillator 50. The MC 51f compares the output of the SUB 51g and the count of the up-counter 51c. The output of the MC 51f goes high when the count of the up-counter 51c becomes equal to the output of the SUR 51g. The up-counter 51e receives the output of the MC 51f as a reset signal; the former is reset when the latter goes high. The output of the MC 51f is halved in frequency by the ½ frequency divider 51h to turn out the signal PLS whose duty ratio is 50%. When the down-counter 51d latches the count of the up-counter 51c, its output b becomes "1" and is fed to the SUB 51g. As a result, the SUB 51g subtracts "1" from the set value a and delivers the result to the MC 51f.

Figure 10:
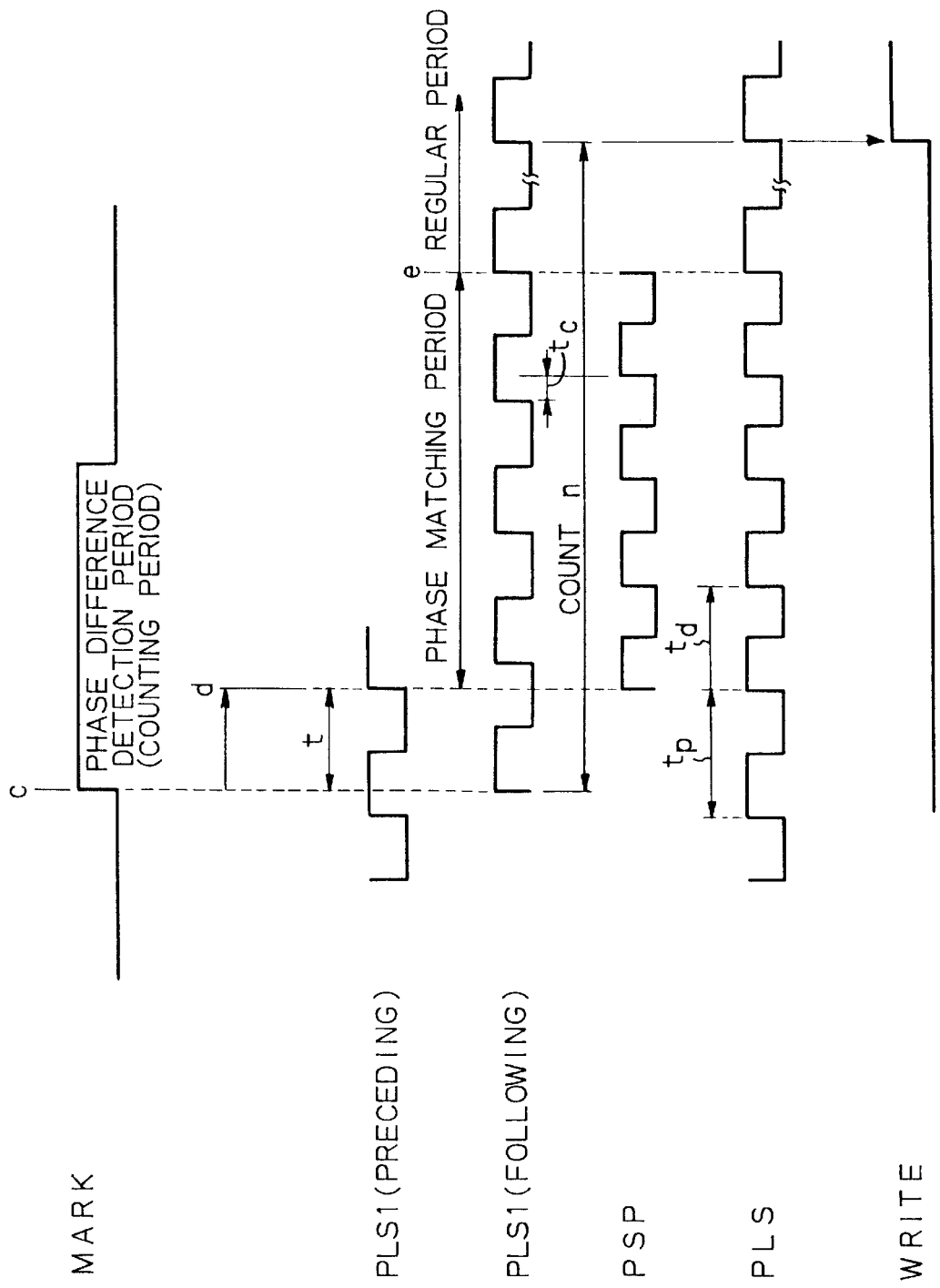
FIG. 10 is a timing chart demonstrating the operation of the phase matching section.

The phase control procedure will be described more specifically with reference to FIG. 10. In FIG. 10, the words "regular period" refer to a period during which ordinary exposure is executed. The words "phase difference detection period" refer to a counting period during which the up-counter 51c counts a phase difference between a motor synchronizing signal PLS1 used for the formation of the preceding toner image (i.e. the phase of the motor 5A) and the mark signal MARK from the mark sensor 40. Further, the words "phase matching period" refer to a period during which the phase of the signal PLS is shifted to the phase of the regular period on the basis of the count of the up-counter 51c occurred during the above-mentioned counting period. A signal WRITE is a write start signal.

The counting period extends from the leading edge c of the mark signal MARK to the first leading edge d of the preceding motor synchronizing signal PLS1. The up-counter 51c counts the clock CLK from the oscillator 5U in response to the output of the F/F 51a during the counting period, as stated above. The last count CNT of the up-counter 51c in the counting period is latched by the down-counter 51d at the trailing edge of the output of the F/F 51a. Assuming that the counting period is t, the count CNT is equal to t/tc. During the phase matching period, the output b of the down-counter 51d becomes "1". As a result, the output PLS of the ½ frequency divider 51d is switched to a pulse signal PSP which starts oscillating at a timing d during the phase marching period. More specifically, when the output b of the down-counter 51d changes from "0" to "1", the period of the pulse signal produced by the up-counter 51c, SUB 51g and MC. 51f changes. As a result, the output PLS of the ½ frequency divider 51h is switched to the pulse signal PSP.

The pulse signal PSP is a reference signal for the rotation phase of the motor 5A. Every time the mirror 53 rotates an angle corresponding to the divisor of the number of faces of the mirror 5B or every time it completes one rotation, the pulse signal PSP appears. The pulse signal PSP has a period td which is equal to tp−tc.

The phase matching period extends to a time e at which the output b of the down-counter 51d changes from "1" to "0" after the appearance of motor synchronizing signals equal in number to the count CNT. After the phase matching period, the phase of the pulse signal PSP is synchronized to the phase of a motor synchronizing signal PSL1 to be used for the formation of an image of the next color (i.e. a regular condition is set up wherein the mark sensor 40 senses the mark 41A of the belt 10). The pulse signal PSP has a period td which is shorter than the period tp. During the phase matching period, the output PLS of the ½ frequency divider 51h has the phase thereof. So controlled as to run after a target phase (constant phase condition of the signal PLS synchronous to the mark 41A detection timing of the mark sensor 40). At the time e when the output b of the down-counter 51d changes from "1" to "0", the signal PLS from the ½ frequency divider 51h is switched to the motor synchronizing signal for a toner image of the next color. As a result, the regular period begins. It follows that during the phase matching period changes on the basis of the count CNT of the up-counter 51c occurred during the counting period, i.e., depending on a phase difference between the motor synchronizing signal used for the preceding toner image (phase of the motor 5A) and the mark signal MARK from the mark sensor 40.

As stated above, the motor synchronizing signal PLS is switched. The motor 5A is driven by a polygon motor driver in response to the signal PLS fed from the ½ frequency divider 51h. The rotation phase of the mirror 5B changes with a change in the rotation phase of the motor 5A which is attributable to a change in the phase of the signal PLS. The counting period and phase matching period constitute, in combination, a rotation phase control period for the mirror 5B. During the phase matching period, the output b of the down-counter 51d is constantly "1", so that the phase of the signal PLS changes little. In the light of this, the phase control over the signal PLS is executed within a range not exceeding the phase control range particular the polygonal mirror driving device 5A.

When the number of marks sensed by the mark sensor 40 coincides with the set number n, the down-counter 51d becomes zero. Then, the CPU 47 delivers the write enable signal ENB to the NOR gate 48 with the result that the write start signal from the NOR gate 48 goes high. At the leading edge of the write start signal, the writing unit 5 starts on exposure with the image data of respective colors. Of course, the phase matching period ends before the CPU 47 counts the marks sensed by the mark sensor 40 up to the set value n.

The first embodiment described above has the following advantages.

(1) The rotation phase of the polygonal mirror 5B is controlled on the basis of the mark detection timing of the mark sensor 40. Hence, the exposing position in the subscanning direction is prevented from being displaced without regard to irregularities in the circumferential length and feed speed of the intermediate belt 10. This allows the toner images of respective colors to be transferred in accurate register with each other.

(2) The formation of a latent image begins on the elapse of a predetermined period of time after the mark detection timing of the mark sensor 40. Therefore, the next image formation can be started after the rotation of the motor 5A has been stabilized. This prevents the image components from being displaced from each other in the initial stage in the subscanning direction.

(3) The mark sensor 40 is implemented by a reflection type photosensor and, therefore, allows the image forming position to be freely set up on the belt 10.

(4) As for the control over the rotation phase of the mirror 5B, the phase matching period is changed on the basis of a deviation in phase determined when the mark sensor 40 senses the mark. Hence, the load on the phase convergence is scattered with the result that sure and stable phase convergence is promoted.

(5) Because the control over the rotation phase of the mirror 5B is executed within a range not exceeding the phase control range of the mirror driving device, a wasteful period of time for phase convergence is not introduced from the outside of the phase control.

(6) The rotation phase of the mirror 5B is controlled such that it runs after a target phase. Hence, the rotation phase of the mirror 5B changes stably.

(7) The management of the interval between the mark detection timing of the mark sensor 40 and the beginning of formation of a latent image is executed by counting the reference signals of the mirror driving device which starts oscillating when the mark sensor 40 senses the mark.

Therefore, the formation of a latent image can begin in matching relation to the phase of the motor 5A.

(8) The control over the rotation phase of the mirror 5B is accurate because it consists of the phase difference detection period and phase matching period.

(9) The reference signal, which is the rotation phase reference for the mirror 5B, is implemented as a pulse signal corresponding to the divisor of the number of faces of the mirror 5B or to one full rotation.of the mirror 5B. Therefore, the scanning phase of the mirror 5B can be controlled by controlling the phase of the reference signal.

2nd Embodiment

Figure 11:
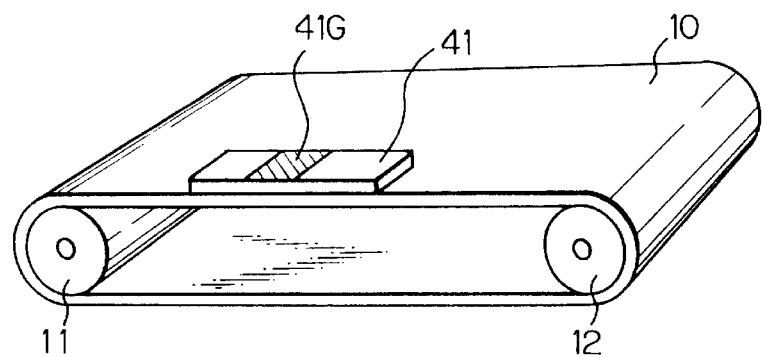
FIGS. 11 and 12 are perspective views of intermediate transfer belts respectively representative a second and a third embodiment of the present invention.

FIG. 11 shows the intermediate belt 10 included in a second embodiment of the present invention. As shown, a sheet member 41 is affixed to one edge of the belt 10 and has a given length which is smaller than the circumferential length of the belt 10. A mark member 41G for the detection of position information is provided on the sheet member 41. The mark member, or mark, 41G is not directly fitted on the belt 10, but it is adhered or otherwise affixed to the sheet member 41 which is fitted on the belt 10. This allows mark member 41G to be surely mounted to the belt 10. The mark member 41G is adhered to the sheet member 41 over a broad area, compared to the case wherein such a mark member is directly fitted on the belt 10. Hence, the mark member 41G can be surely fixed in place on the belt 10.

3rd embodiment

Figure 12:
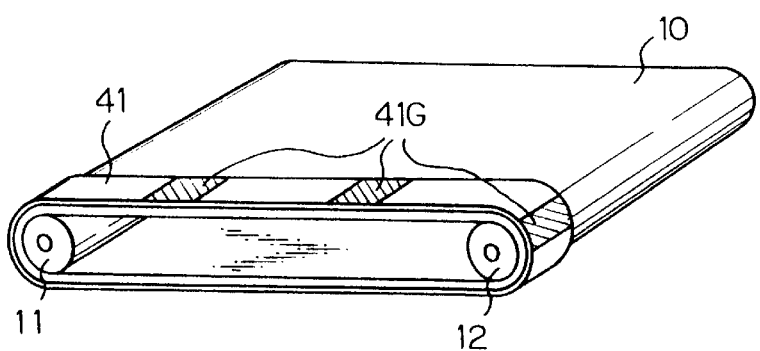
Figure 13A:
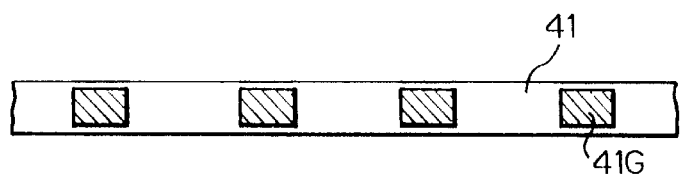
FIG. 13A is a fragmentary plan view of a sheet member affixed to the belt of FIG. 12.
Figure 13B:
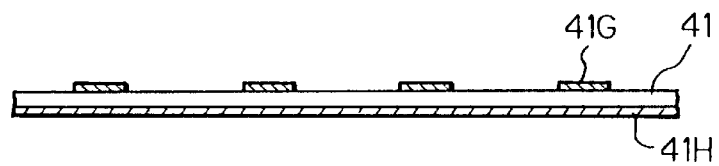
FIG. 13B is a fragmentary section of the sheet member.

FIG. 12 shows the intermediate belt 10 included in a third embodiment of the present invention. As shown, the sheet member 41 is adhered or otherwise affixed to one end of the belt 10 over the entire circumference of the belt 10. A plurality of mark members, or marks, 41G are printed or painted on or thermally transferred to the sheet member 41 at substantially equally spaced locations, as shown in FIG. 13A. If desired, the plurality of marks 41G may be replaced with a single mark (particularly when the photoconductive element has a scam). In the illustrative embodiment, as shown in FIG. 13B, the sheet member 41 has the mark members 41G on the top and adhesive 41H on the bottom. The sheet member 41 is affixed to the belt 10 by the adhesive 41H. By fitting a single sheet member 41 to the entire circumference of the belt 10, it is possible to affix the mark members 41G more firmly and surely to the belt 10.

In the embodiment, the sheet member 41 may play the rate of a reinforcing member for the belt 10 at the same time. Generally, a belt made of fluorine-contained resin (ETFE) is a typical intermediate belt. This kind of belt is often provided with a reinforcing member at the edge thereof. The reinforcing member is made of a material having high flexibility. Hence, when the reinforcing member is used as the sheet member 41 and provided with the mark members 41G beforehand, the mark members 41G can be affixed to the belt 10 simultaneously with the reinforcing member.

In the second and third embodiments, the sheet member 41 and the mark member or members 41G should preferably be different in reflectance from each other as much as possible, so that position information may be accurately detected by, for example, a reflection type photosensor. For example, the sheet 41 and the mark or marks 41B may be respectively colored in black and in gold, silver or white.

4th Embodiment

Figure 14:
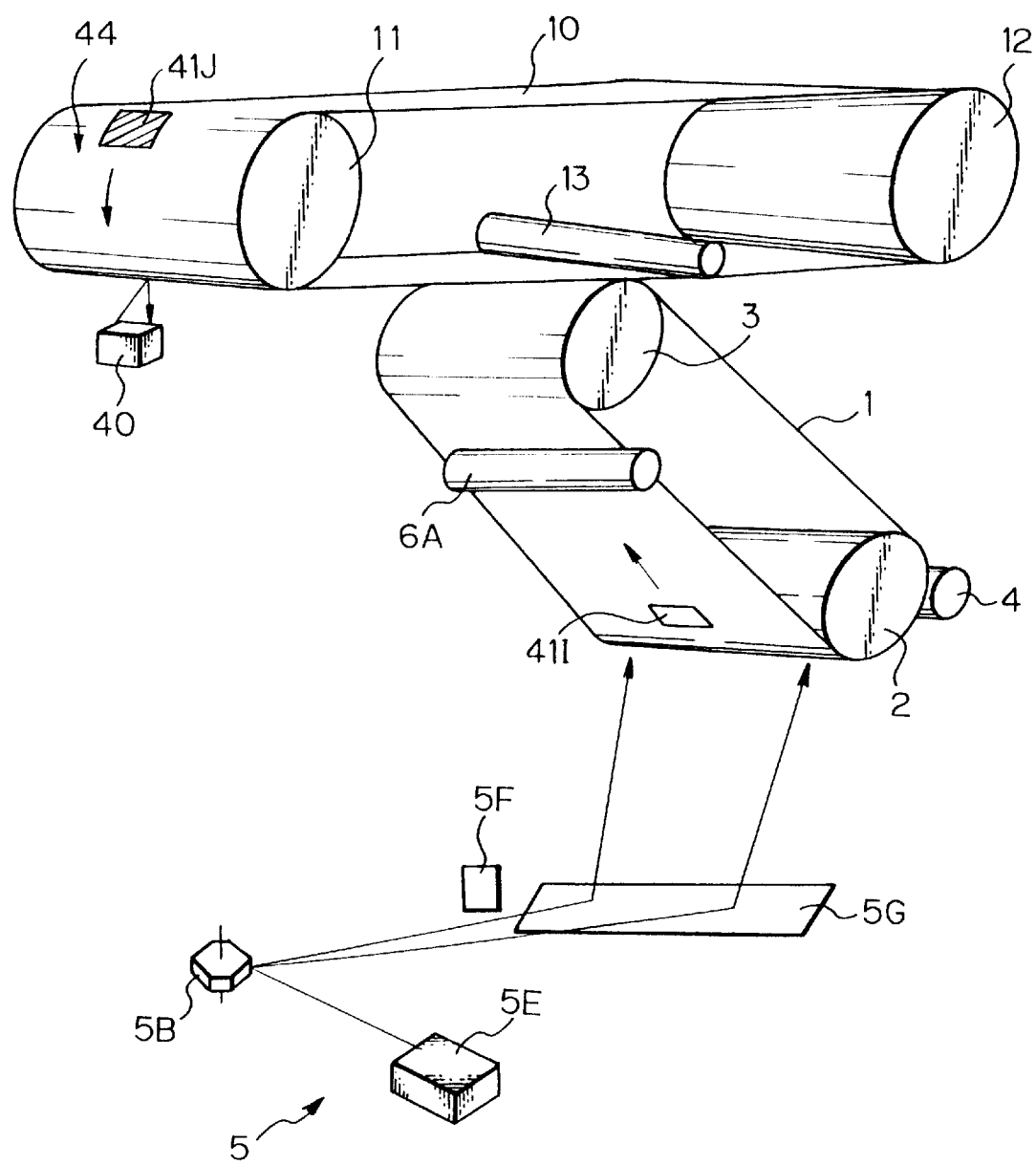
FIG. 14 is a perspective view of an arrangement extending from a laser writing unit to a mark sensor and representative of a fourth embodiment of the present invention.

FIG. 14 shows an arrangement extending from the writing unit 5 to the mark sensor 40 similar to the arrangement of FIG. 7, but representative of a fourth embodiment of the present invention. In this embodiment, the intermediate belt 10 is not provided with any mark. As shown in the figure, the laser beam from the laser 5F is steered by the mirror 5B which is in rotation. The beam from the mirror 5B is reflected by a reflector 5G and then incident to the photoconductive belt 1. At this instant, the writing unit 5 forms on the belt 1 a latent image 41I representative of position information. The latent image 41I is developed by a developing sleeve 6A included in the developing unit 6. The resulting toner image is transferred from the belt 10 to the belt 10 by the bias roller 13 to which a bias is applied. The toner image, or mark, 41J transferred to the belt 10 is moved counterclockwise due to the rotation of the belt 10. On sensing the mark 41J, the mark sensor 40 generates a position information signal. The laser beam from the reflector 5G is sensed by the beam sensor 5F, as stated earlier.

Figure 15:
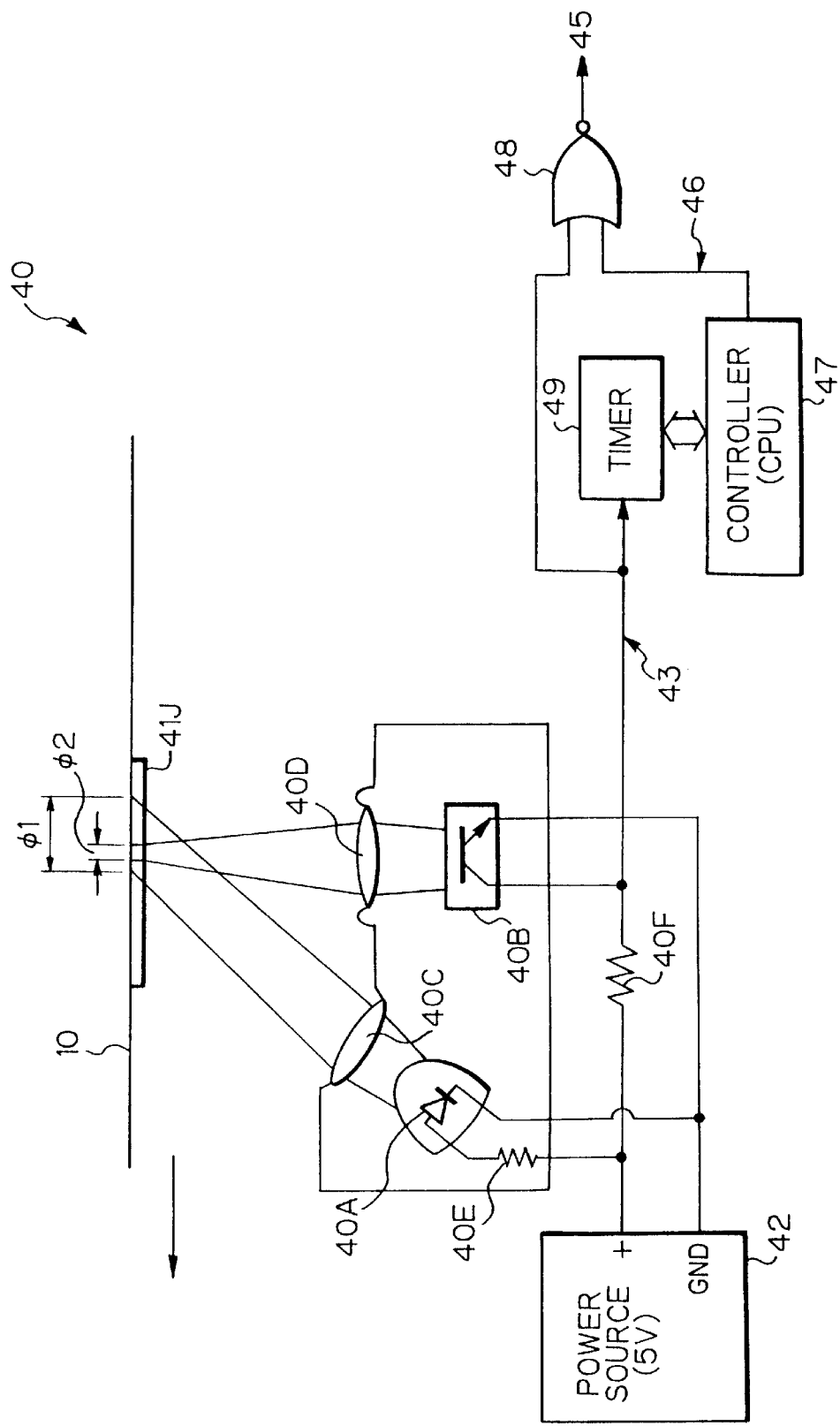
FIG. 15 shows the arrangement of the mark sensor included in the fourth embodiment.

As shown in FIG. 15, the mark sensor 40 includes a light emitting diode (LED) 40A. The LED 40A emits light toward the belt 10 via a lens 40C at an angel of 45 degrees to a line perpendicular to the surface of the belt 10 where a mark 41J is positioned. A phototransistor, or light-sensitive element, 40B receives a reflection from the belt 10 via a lens 40D at an angle of 0 degree to the above-mentioned line. The beam spot incident to the belt 10 from the LED 40A has a diameter $\Phi1$ greater than the diameter $\Phi2$ of the beam spot incident to the phototransistor 40B from the belt 10, i.e., approximately $\Phi1=\Phi2\neq2$. The LED 40A and phototransistor 40B are connected at one end to the +5 V terminal of a power source 42 via resistors 40E and 40F, respectively. The other ends of the LED 40A and phototransistor 40B are connected to the ground terminal (GND) of the power source 42. The phototransistor 40B is turned on or turned off depending on the presence or absence of the mark 41J of the belt 10, and outputs a detection signal 43. The detection signal 43 is input to a timer 49 and a gate 48. When the phototransistor 40B is turned on, the timer 49 starts counting the clock at the trailing edge of the detection signal 43.

The CPU 47, monitoring the count of the timer 49, inputs a mask signal 46 to the gate 48 in accordance with the count. The gate 48 outputs the detection signal 43 in accordance with the mask signal 46. The detection signal 43 from the gate 48 is delivered to the writing unit 5 as the write start signal 45. In response, the writing unit 5 starts exposing the belt 1. The laser beam issuing from the writing unit 5 has a diameter of 80 $\mu$m while the beam spot incident to the phototransistor 40B has a diameter of 2 mm. This successfully averages irregularities in the exposure and the deposition of the developer.

Figure 16:
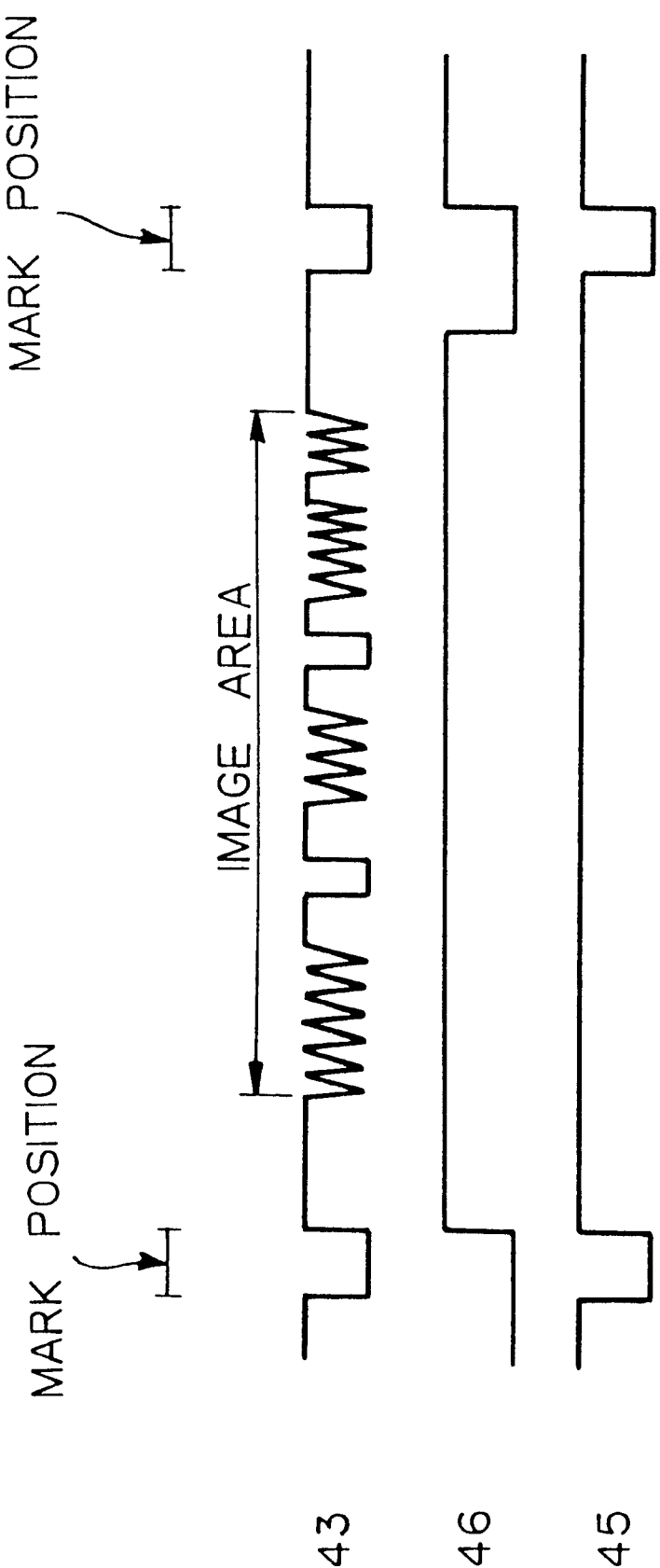
FIG. 16 is a timing chart representative of the operation of the mark sensor shown in FIG. 15.

FIG. 16 shows the operation timing of the mark sensor 40. The mark sensor 40 senses not only the mark 41J but also an image in the image area of the belt 10. In the light of this, the CPU 47 sorts generating the mask signal 46 when the mark sensor 40 senses the mark 41J for the first time and triggers the timer 49. When the belt 10 makes approximately one turn until the point thereof about 10 mm upstream of the mark 41J with respect to the direction of rotation arrives at the sensing position assigned to the mark sensor 40, the CPU 47 stops generating the mark signal 46.

The point of the belt 10 about 10 mm upstream of the mark 41J as mentioned above intervenes between the trailing edge of the image area of the belt 10 and the leading edge of the mark 41J. However, this point may be replaced with any other suitable point so long as it intervenes between the trailing edge of the image area and the leading edge of the mark 41J. The mask signal 46 generated by the CPU 47 allows the write start signal 45 to detect only the mark 41 of the belt 10, so that the toner images of respective colors can be held in accurate register with each other.

Figure 17B:
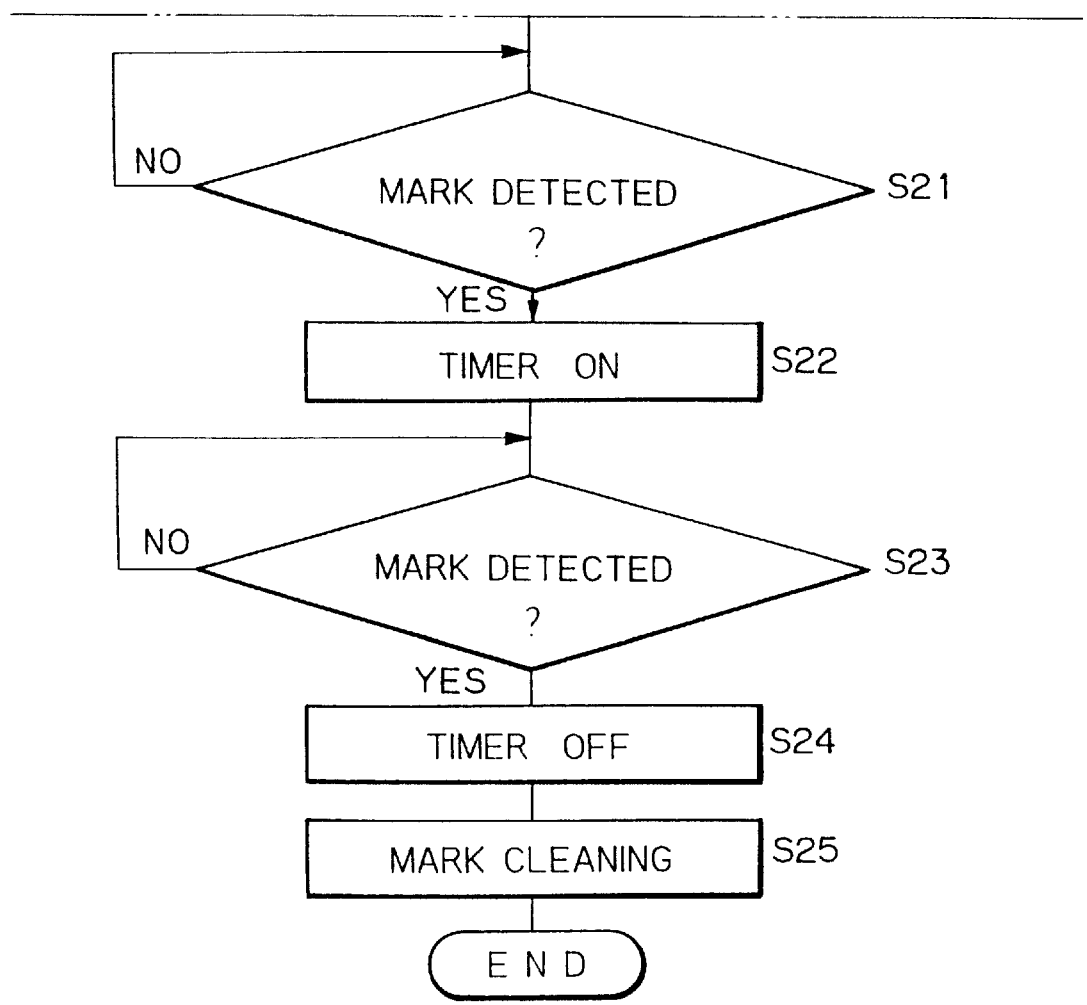
FIGS. 17–19 are flowcharts demonstrating the operation of the fourth embodiment.

FIG. 17 shows a procedure for measuring a distance corresponding to one turn of the belt 10 and executed at the start-up of the power source. As shown, the CPU 47 causes the belts 1 and 10 to start rotating via the respective driving devices (step S10). Then, the CPU 47 turns on the power source assigned to the charge roller 4 and thereby causes it to uniformly charge the surface of the belt 10 (step S11). The CPU 41 commands the writing unit 5 to start writing a n image representative of the mark 41I (step S12). As the mark 41 is sequentially moved, the CPU 47 causes the driving device assigned to one developing unit, e.g., black developing unit 6 to rotate the developing roller 6A and other constituents of the unit 6 (step S13). Subsequently, the CPU 47 causes the high-tension power source for development to apply a bias to the developing roller 6A (step S14), and causes the high-tension power source for image transfer to apply a bias to the bias roller 13 (step S15).

The CPU 47 determines whether or not the belt 10 has moved a distance over which (he mark 41J has been transferred to the belt 10 (step S16). If the answer of the step S16 is YES, the CPU 47 turns off the power source of the charge roller 4 (step S17) and turns off the high-tension power source for development, i.e., the bias to the developing roller 6A (step S18). Subsequently, the CPU 47 causes the developing roller 6A and other constituents of the developing unit 6 to stop rotating via the associated driving device (step S19). Then, the CPU 47 causes the high-tension power source for image transfer to stop applying the bias to the bias roller 13 (step S20).

When the mark sensor 40 senses the mark 41J on the belt 10 (YES, step S21), the timer 49 is triggered by the detection signal 43 (step S22). When the mark sensor 40 again senses the mark 41J after the one turn of the belt 10 (YES, step S23), the timer 49 stops operating (step S24). The CPU 47 reads the count of the timer 49 which is representative of a distance corresponding to the one turn of the bell 10. The driving device, or motor, for rotating the belt 10 should preferably be of the kind whose speed changes little. Finally, the cleaning device 16 erases the mark 41J by cleaning the belt 10 (step S25).

Figure 18:
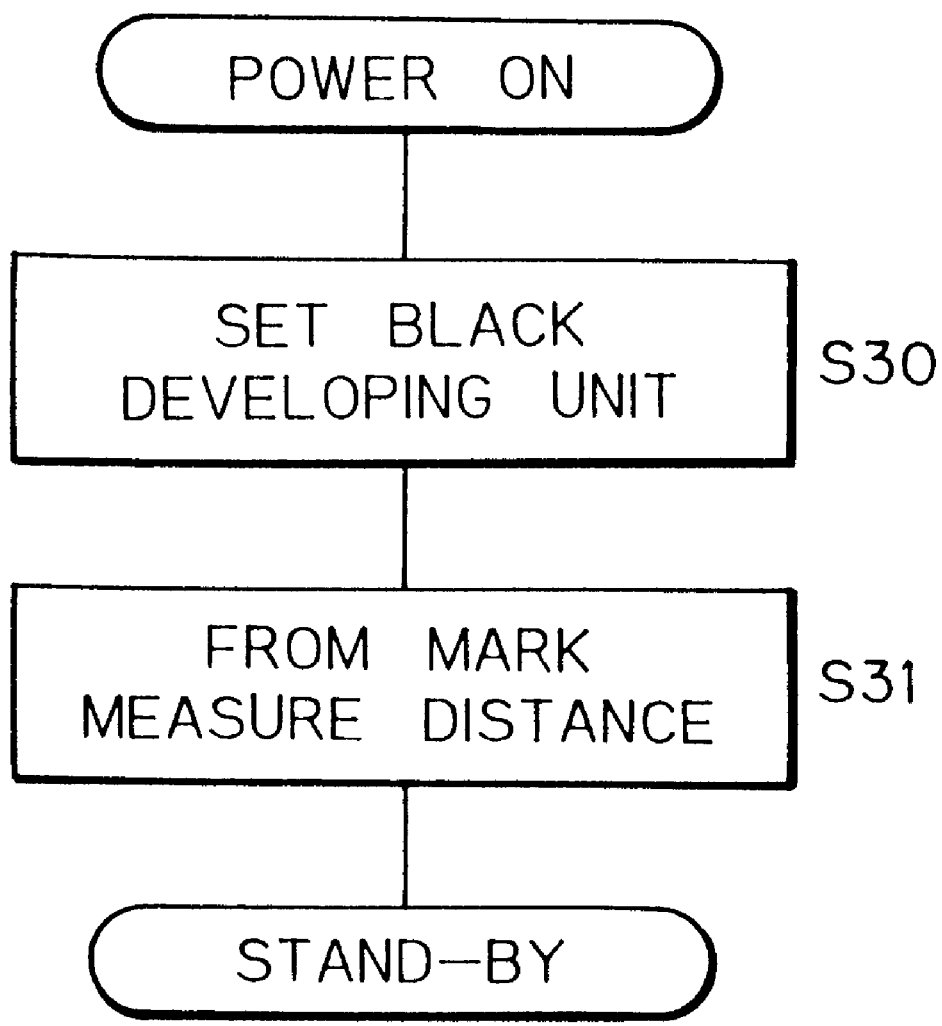

The general operation of this embodiment, beginning with the start-up of the power source, is shown in FIG. 18.

As shown, the CPU 47 controls the revolver to bring the black developing unit 6 to the developing position (step 530).

Subsequently (step S31), the CPU 47 forms the mark 41J on the belt 10 and then measures the distance corresponding to one turn of the belt 10, as described with reference to FIG. 7. Then, the apparatus waits for image formation.

Figure 19B:
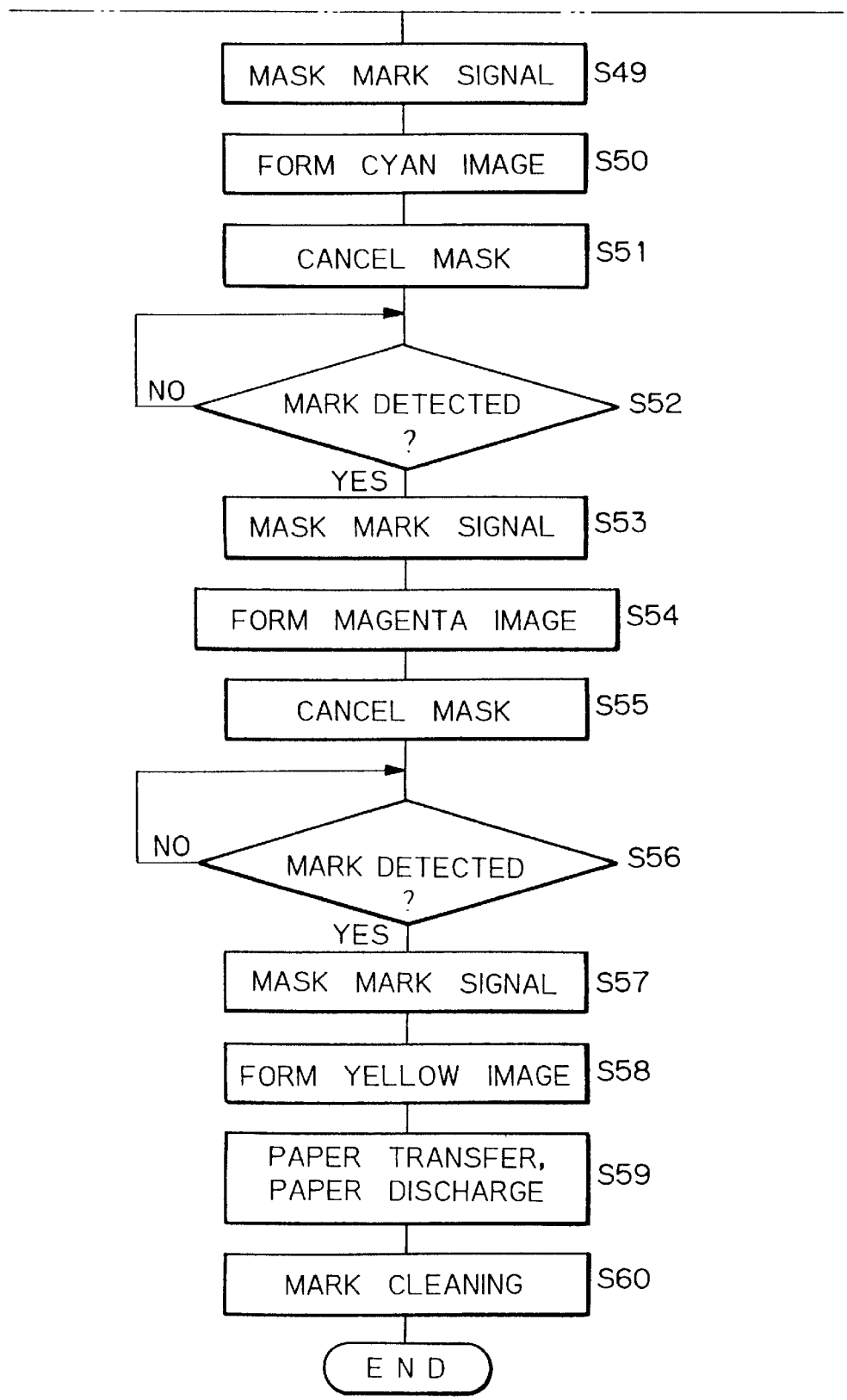

Referring to FIG. 19, the operation beginning with the reception of image data will be described. As shown, the CPU 47 rotates the revolver until the black developing unit 6 has been brought to the developing position (step S40). The CPU 47 causes the mark 41J to be formed on the belt 10 by the above-described procedure, locates the mark 41J at a position 44, FIG. 14, 30 mm upstream of the sensing position assigned to the mark sensor 40 in the direction of rotation of the belt 10, and then stops the belt 10 (step S41). When image data from the image reading device have been fully written to the frame memory (YES, step S42), the CPU 47 rotates the belt 10 via the associated driving device (step S43). When the mask sensor 40 senses the mark 41J (YES, step S44), the timer 49 starts on a counting operation. At the same time, a write start signal is fed from the gate 48 to the writing unit 5 with the result that image writing in black begins. When the trailing edge of the mark 41J arrives at the sensing position assigned to the mark sensor 40, the CPU 47 causes the mask signal to go high (step S45). The mask signal masks the detection signal 43. In this condition, a black toner image is formed on the belt 1 and then transferred to the belt 10, as stated earlier (step S46). When the belt 10 makes approximately one turn until the mark 41J reaches a position about 10 mm upstream of the sensing position, the CPU 47 causes the mask signal to go low and thereby stops masking the detection signal 43 (step S47).

When the mark sensor 41J senses the mark 41J again (YES, step S48), the timer 49 starts on a counting operation. The gate 48 delivers a write start signal to the writing unit 5 to cause it to start writing a cyan image. When the trailing edge of the mark 41J arrives at the sensing position assigned to the mark sensor 40, the CPU 47 causes the mask signal to go high, thereby masking the detection signal 43 (step S49). In this condition, a cyan toner image is formed on the belt 1 and then transferred to the belt 10 over the black image (step S50). When the belt 10 makes approximately one turn until the mark 41J reaches the position about 10 mm upstream of the sensing position, the CPU 47 causes the mask signal to go low and thereby stops masking the detection signal 43 (step S51).

When the mark sensor 41J senses the mark 41J again (YES, step S52), the timer 49 starts on a counting operation. The gate 48 delivers a write start signal co the writing unit 5 to cause it to start writing a magenta image. When the trailing edge of the mark 41J arrives at the sensing position, the CPU 47 causes the mask signal to go high, thereby masking the detection signal 43 (step S53). In this condition, a magenta toner image is formed on the belt 1 and then transferred to the belt 10 over the composite image existing on the belt 10 (step S54). When the belt 10 makes approximately one turn until the mark 41J reaches the position about 10 mm upstream of the sensing position, the CPU 47 causes the mask signal to go low and thereby stops masking the detection signal 43 (step S55).

When the mark sensor 41J senses the mark 41J again (YES, step S56), the timer 49 starts on a counting operation.

The gate 48 delivers a write start signal to the writing unit 5 to cause it to start writing a yellow image. When the trailing edge of the mark 41J arrives at the sensing, the CPU 47 causes the mask signal to go high, thereby masking the detection signal 43 (step S57). In this condition, a yellow toner image is formed on the belt 1 and then transferred to the belt 10 over the composite image, completing a full-color image (step S58). Then, the full-color image is transferred from the belt 10 to a paper and fixed on the paper by the fixing device 20, and then the paper is driven out to the tray 23 (step S59). Finally, the cleaning device 16 erases the mark 41B by cleaning the belt 10 (step S60).

The fourth embodiment described above has the following advantage (9) in addition to the previously stated advantages (1)–(8).

(9) Because the belt 10 is seamless, the mark 41J can be formed in any position on the belt 10. This allow the belt 10 to be evenly used over the entire circumference thereof 5th Embodiment Referring to FIG. 20, a rotation phase matching section 58 and a control section 52 assigned to the motor 5A are shown which are representative of a fifth embodiment of the present invention. As shown, the matching section 58 includes a synchronizing signal generating circuit 53 for generating a motor synchronizing signal PLS1. A long pulse generating circuit 57 generates pulses PLS 3 which will be described. A multiplexer 56 selects one of the synchronizing signal PLS1 and pulses PLS3. A timing signal generating circuit 55 delivers a timing signal to each of the circuits 53, 56 and 57. An oscillator 50 produces a clock CLK which is the reference for the circuits 53, 56, 57 and 55.

Figure 21:
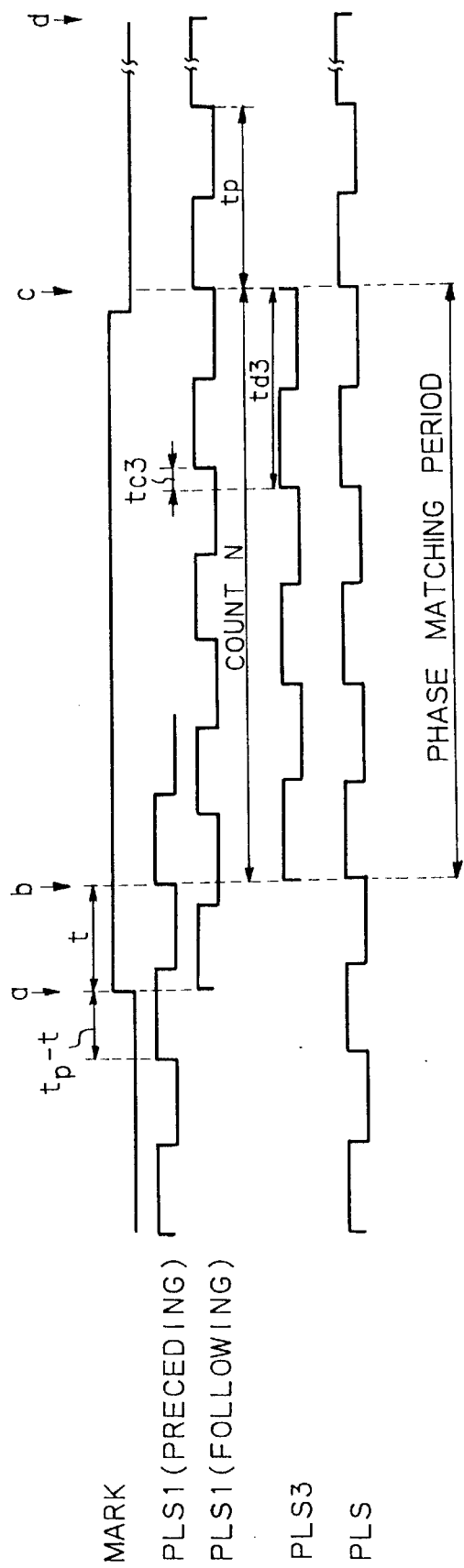
FIG. 21 is a timing chart showing operation of the control section of FIG. 20.

As shown in FIG. 21, the timing signal generating circuit 55 delivers a signal MK3 to the long pulse generating circuit 57 at a time b when the motor synchronizing signal PLS1 for the preceding toner image rises. In response, the long pulse generating circuit 57 generates pulses PLS3 having a greater width than the signal PLS1 assigned to the preceding toner image. How many times the pulse PLS3 should be generated is determined on the basis of the difference between the times a and b. The number of times N of generation is expressed as:

$$N=(tp-t)/(td3-tp)$$

where tp d and td3 denote the pulse width of the signal PLS1 and the pulse width of the pulses PLS3, respectively.

When the long pulse generating circuit 57 generates the pulse PLS3 N times, the phase of the signal PLS1 and that of the pulses PLS3 coincide at a time c. When the pulse generating circuit 57 ends generating the pulses PLS3, it sends a signal NEND3 to the timing signal generating circuit 55. The multiplexer 56 usually selects the signal PLS1. During the phase matching period in which the pulses PLS3 appear, the multiplexer 56 selects them. This is controlled by a signal SEL output from the liming signal generating circuit 55. As a result, the phase of the signal PLS1 is sequentially shifted due to the pulses PLS3 and, in turn, controls the rotation phase of the motor 5A. Specifically, the phase of the motor 5B is sequentially retarded by the pulses PLS3. After the phase marching period, the rotation of the motor 5A is stabilized at a time d. Then, an image writing operation begins.

The control described above is executed with each of the different colors. Hence, toner images can be formed one above the other in accurate register in the subscanning direction, ensuring an attractive color image.

6th Embodiment

Figure 22:
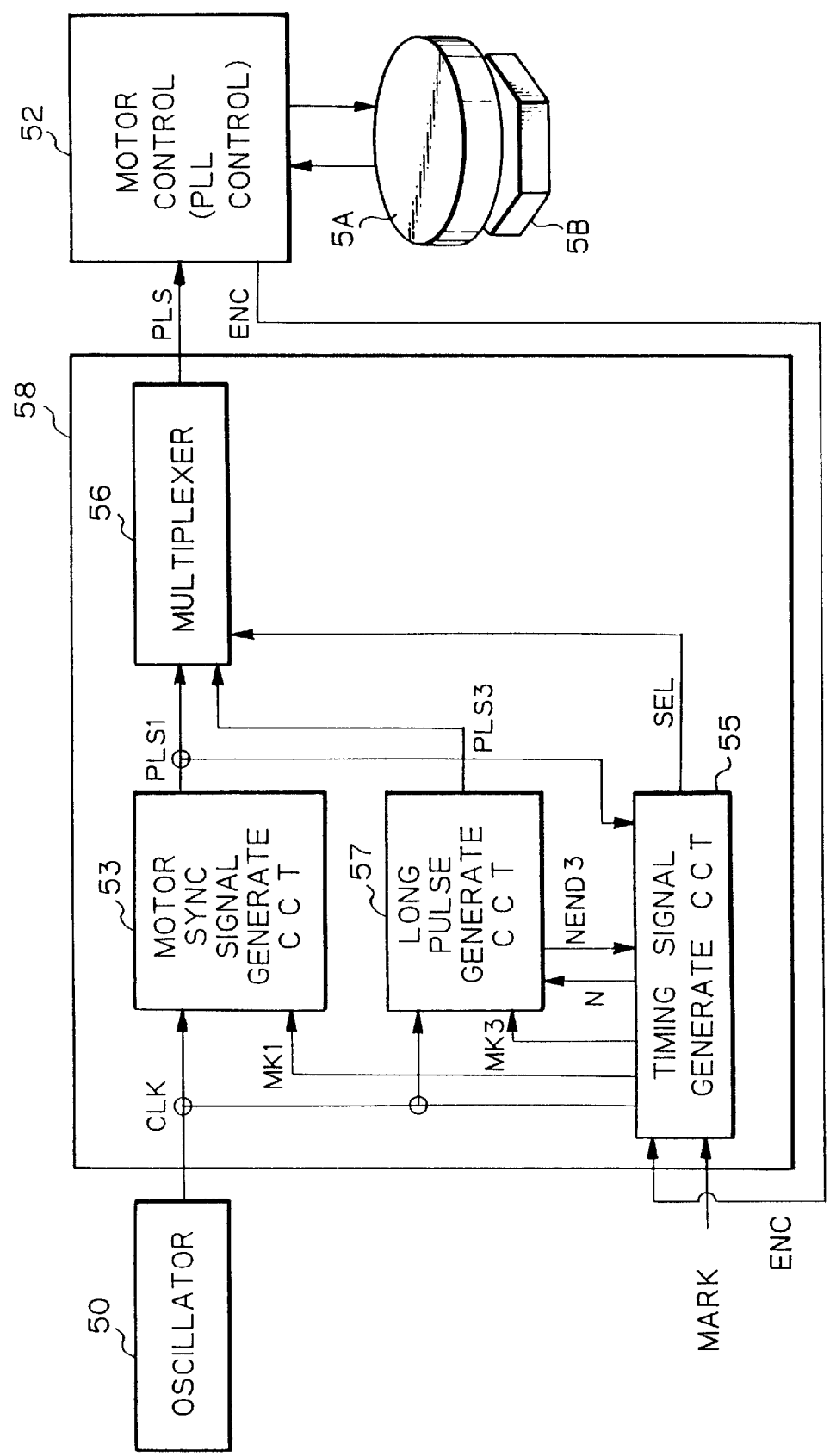
FIG. 22 is a block diagram schematically showing a phase matching section and a control section representative of a sixth embodiment of the present invention.

FIG. 22 shows a rotation phase matching section and a control section assigned to the motor 5A and representative of a sixth embodiment of the present invention. This embodiment is essentially similar to the fifth embodiment except that an encoder signal ENC is delivered from the control section 52 to the timing signal generating circuit 55.

Figure 23:
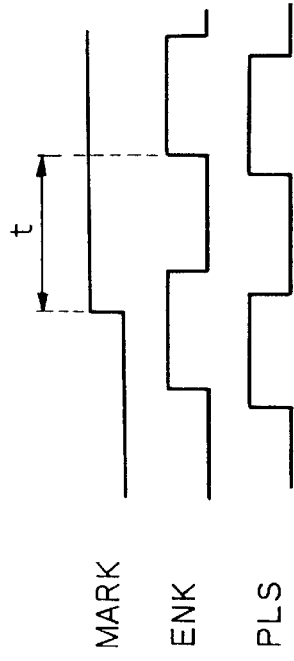
FIG. 23 is a timing chart showing the operation of the control section of FIG. 22.

In this embodiment, the motor synchronizing signal PLS input to the control section 52 and the encoder signal ENC input to the timing signal generating circuit 55 have the same number of pulses for one rotation of the mirror 5B. FIG. 23 shows a relation between the two signals PLS and ENC. As shown, the signals PLS and ENC are held in a predetermined relation in respect of phase. Also shown in FIG. 23 is the mark signal MARK. The pulses PLS 3 can be generated on the basis of the deviation t between the signals MARK and ENC in order to execute the phase control in the same way as in the fifth embodiment. Because this embodiment controls the phase of the mirror 5B in the same manner as the fifth embodiment, the resulting color image is free from color displacement.

7th Embodiment

Figure 24:
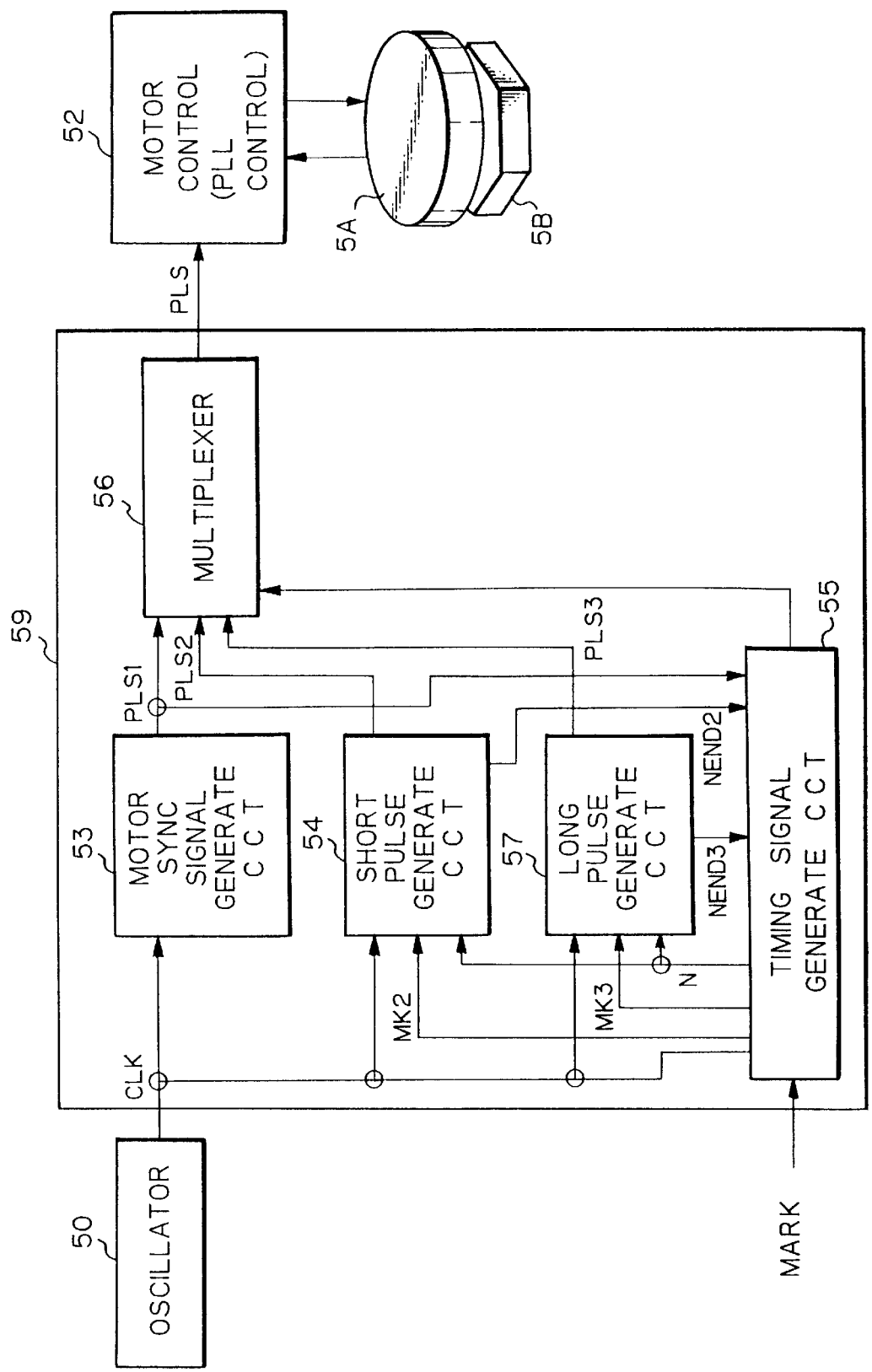
FIG. 24 is a schematic block diagram showing a phase matching section and a control section representative of a seventh embodiment of the present invention.

FIG. 24 shows a rotation phase matching circuit 59 representative of a seventh embodiment of the present invention. As shown, the matching circuit 59 has the synchronizing signal generating circuit 53, a short pulse generating circuit 54 for generating pulses PLS2 whose duration is slightly short, the long pulse generating circuit 57, the multiplexer 56 for selecting one of the synchronizing signal PLS1, short pulses PLS2, and long pulses PLS3, the timing signal generating circuit 55, and the oscillator 50 which generates the clock CLK.

The operation of the circuitry shown in FIG. 24 is basically similar to the operation of the circuitry shown in FIG. 20. The difference is that either the short pulses PLS2 or the long pulses PLS3 are selected for the phase control, depending on the mark signal MARK. FIGS. 25A and 25B respectively show phase matching implemented by the short pulses PLS2 and phase matching implemented by the long pulses PLS3. As shown, phase matching can be completed in a shorter time with the short pulses PLS2 than with the long pulses PLS3.

When the mark signal MARK rises when the synchronizing signal PLS1 for the preceding toner image is in a high level, phase matching is effected by the long pulses PLS3. When the leading edge of the mark signal MARK occurs while the signal PLS1 is in a low level, use is made of the short pulses PLS2 in order to reduce the phase matching time.

In FIG. 24, the timing signal generating circuit 55, receiving the signals PLS1 and MARK, determines which of the short pulses PLS2 and long pulses PLS3 should be used. When the short pulses PLS2 should be used, the circuit 55 delivers a signal MK2 and the number of pulses N to the short pulse generating circuit 54. When the long pulses PLS3 should be used, the circuit 55 feeds a signal MK3 and the number of pulses N to the long pulse generating circuit 57. In response, the circuits 54 and 57 respectively generate the short pulses PLS2 and long pulses PLS3. On outputting the required number of pulses, the circuits 54 and 57 each returns a signal NEND2 or NEND3 to the circuit 55.

The multiplexer 56 selects the synchronizing signal PLS1 during usual operation, selects the short pulses PLS2 during the phase matching period in which they appear, or selects the long pulses PLS3 during the phase matching period in which they appear. For such selection, the timing signal generating circuit 55 delivers a signal SEL to the multiplexer 56. Finally, the multiplexer 56 outputs the synchronizing signal PLS.

As stated above, the embodiment selectively executes phase matching with the short pulses PLS2 or with the long pulses PLS3, depending on the timing of the mark signal MARK. This reduces the phase matching time and, therefore, the interval between the detection of the mark and the beginning of image writing. As a result, the entire process is executed at high speed.

8th Embodiment

Figure 26:
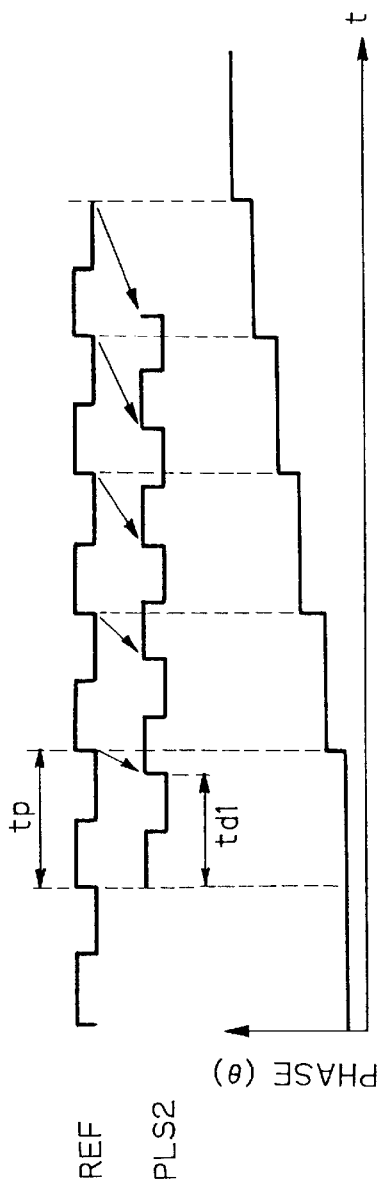
FIGS. 26 and 27 are timing charts demonstrating a phase control procedure particular to an eighth embodiment of the present invention.

FIG. 26 shows a phase matching procedure using the short pulses PLS2 and representative of an eighth embodiment of the present invention. As shown, the phase of the short pulses PLS2 is shifted relative to a reference signal REF.

Figure 27:
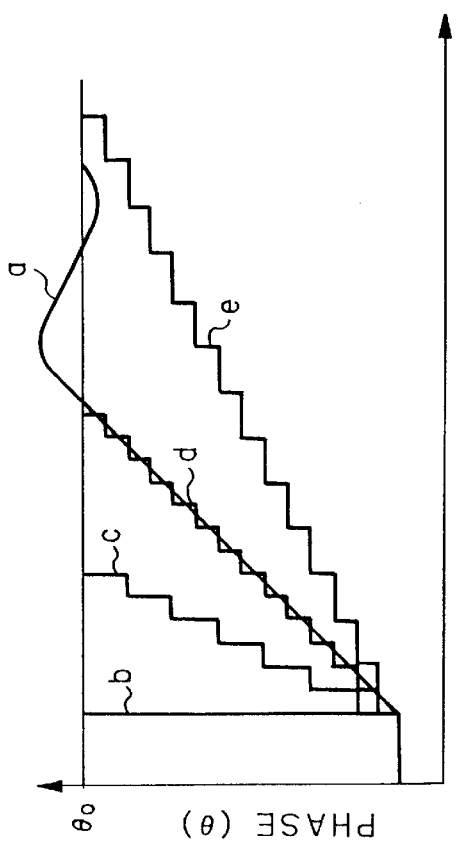

FIG. 27 shows, in addition to the phase shift of the short pulses PLS2 relative to the reference signal REF, the response of the phase of the motor 5A itself to occur when the phase of the motor 5A is changed stepwise as indicated by a. When the phase of the synchronizing signal PLS input to the control section 52 is changed stepwise as indicated by b, the phase of the motor 5A itself changes as indicated by a. The phase change a of the motor 5A depends on the time constant of closed loop or phase locked loop (PLL) control particular to the control section 52. Preferably, the degree of phase shift (amount of change) should match the response (a) of the motor 5A itself.

In FIG. 27, b and c represent a case wherein the synchronizing signal PLS has sharply changed. In this case, the control section 52 is apt to fail to set up synchronization (in FIG. 27, a indicates a synchronous state). Particularly, when the final amount of phase change (corresponding to $\theta_0$ shown in FIG. 27) is great, the synchronization is likely to fail. Once the synchronization fails, the PLL control must effect synchronization again, wasting a substantial period of time. When the degree of phase shift is equivalent to the time response of the motor 5A itself, as indicated by c in FIG. 27, the synchronization is ensured. Further, d in FIG. 37 shows a case in which the degree of phase change is even lower than in the case c; the motor 5A will follow the phase shift more stably.

In the illustrative embodiment, the degree of phase shift is selected to be equal to or lower than the time constant of the control loop of the control section 52. By selecting a low degree of phase shift, it is possible to prevent the motor 5A from being brought out of synchronization during phase shift. This ensures phase matching while saving time otherwise necessary for resynchronization.

9th Embodiment

When the phase matching effected in such a manner as to eliminate the failure of synchronization, as stated above, it is also achievable even when the synchronizing signal PLS has a number of pulses for one rotation which is a multiple of the number of faces of the mirror 5B, as shown in FIGS. 28A and 28B. In the specific condition shown in FIGS. 28A and 28B, the mirror 50B is assumed to have six faces, and the synchronizing signal PLS is assumed to have twelve pulses for one rotation. To indicate the phase of the mirror 5B, the figures show a mirror face detection signal POLY.

In FIG. 28A, phase matching is effected by the short pulses PLS2 appearing in response to the mark signal MARK.

In FIG. 28B, the short pulses PLS2 are also generated in response to the mark signal MARK. However, in FIG. 28B, the short pulses PLS2 appear a greater number of times thin in FIG. 28A, and the phase is shifted by more than one pulse of the synchronizing signal PLS. On the elapse of a period of time T1 after the mark signal MARK (time b when the phase matching completes), the phase of the mirror 5B (detection signal POLY) appears at the same timing as counted from the mark signal MARK. While the number of pulses of the signal PLS for one rotation is assumed to be double the number of faces of the mirror 5B, it may, of course, be any other suitable multiple.

It often occurs that the synchronizing signal PLS input to the control section 52 must have many pulses for one rotation of the motor 5A in order to configure a stable control system. In this sense, the phase matching based on a multiple of the number of mirror faces is effective means for the motor control section 52.

While the eighth and ninth embodiments have concentrated on the short pulses PLS2, they are, of course, operable in the same way with the long pulses PLS3 or both of the pulses PLS2 and PLS3.

10th Embodiment

When the number of pulses of the synchronizing signal PLS for one rotation is a multiple of the number of mirror faces, it is preferable to use an error detecting circuit for determining whether or not the phase matching is adequate.

Figure 29:
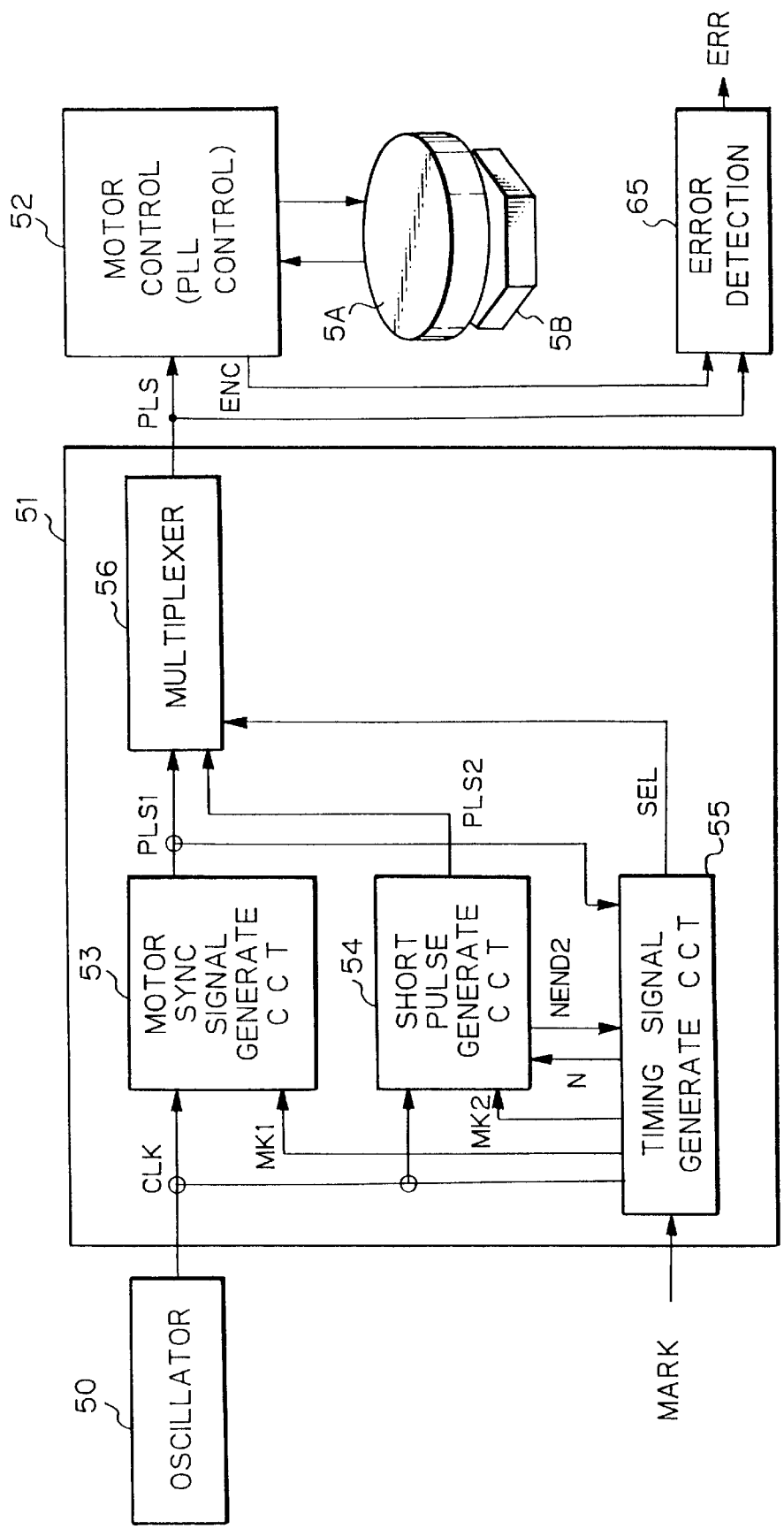
FIG. 29 is a block diagram schematically showing a phase matching section and control section representative of a tenth embodiment of the present invention.

FIG. 29 shows a tenth embodiment of the present invention including an error detection section 65. As shown, the encoder signal ENC from the control section 52 is input to the error detection section 65. The section 65 determines whether or not the phase shift using the short pulses PLS2 has been accurately executed, and outputs a signal ERR representative of the result of decision. When the signal ERR indicates an error, a CPU or similar controller, not shown, executes phase matching again.

The operation of the error detection section 65 will be described with reference to FIGS. 30A and 30B. Again, assume that the mirror 5B has sit faces, and that the synchronizing signal PLS has twelve pulses for one rotation.

FIG. 30A shows a case wherein the phase shift is accurate. The section 65 constantly divides the frequency of the synchronizing signal PLS and that of the encoder signal ENC input thereto. Further, the section 65 samples a divided encoder signal DENC at the leading edges of a divided synchronizing signal DPLS. So long as the control section 52 properly operates and accurately follows the synchronizing signal PLS, the error signal ERR does not change after the phase matching; it remains in a low level, as shown in FIG. 30A. Assume that some error has occurred during phase shift and has caused the synchronization of the PLL control of the control section 52 to fail. Then, the mirror 5A Fails to accurately follow the synchronizing signal PLS input to the control section 52. It is, therefore, considered that the phase shift is not accurate. FIG. 30B demonstrates a case wherein the phase shift is not accurate. As shown, the error signal ERR goes high after the phase shift and indicates that the phase shift has failed. The controller (CPU) detects the error by monitoring the error signal ERR.

11th Embodiment

The ninth embodiment allows the synchronizing signal to have a number of pulses for one rotation which is equal to the divisor or the multiple of the number of mirror faces or to equal the number of mirror faces. This kind of scheme, however, makes the phase matching impracticable when the signal PLS and the number of mirror faces satisfy the above relation. An eleventh embodiment to be described implements the phase matching even when the above relation is not satisfied. In this embodiment, it is assumed that the signal PLS has twenty pulses for one rotation of the motor 5A, and that the mirror 5B has six faces.

As shown in FIG. 31, a phase matching circuit 66 includes a synchronizing signal generating circuit 67 for generating a synchronizing signal MIRR synchronous to the faces of the mirror 5B. The timing signal generating circuit 55 receives the signal MIRR, determines a time difference between the signals MARK and MIRR, and then generates the short pulses PLS2 matching the difference.

Figure 32:
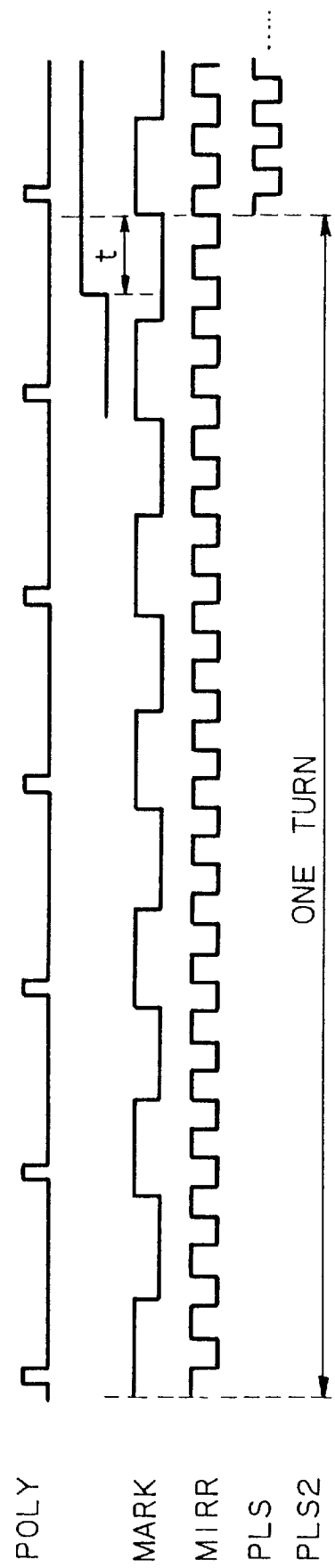
FIG. 32 is a timing chart representative of the operation of the eleventh embodiment.

FIG. 32 demonstrates the operation of the eleventh embodiment As shown, the synchronizing signal MIRR appears in a predetermined phase relation to the mirror face detection signal POLY at all times. The time difference between the signals MIRR and MARK determines the number N of short pulses PLS2 to be generated, as follows:

$$N = t/(tp - td2)$$

where tp and td2 denote the pulse width of the signal PLS and the pulse width of the pulses PLS2, respectively.

When the short pulse PLS2 is generated N times, the signals PLS and PLS2 coincide in phase with each other. In this case, the phase should only be shifted by 20/6 pulses at maximum. When the phase is so shifted, a certain relation holds between the signals MIRR and PLS and implements the phase matching without regard to the relation between the signal PLS and the number of mirror faces.

While the embodiment generates the short pulses PLS2 on the basis of the time difference between the signals MARK and MIRR, the signal MIRR may be replaced with the signal POLY. In this case, the short pulses PLS2 are also generated in accordance with the time difference t between the signals MARK and POLY.

12th Embodiment

Figure 33:
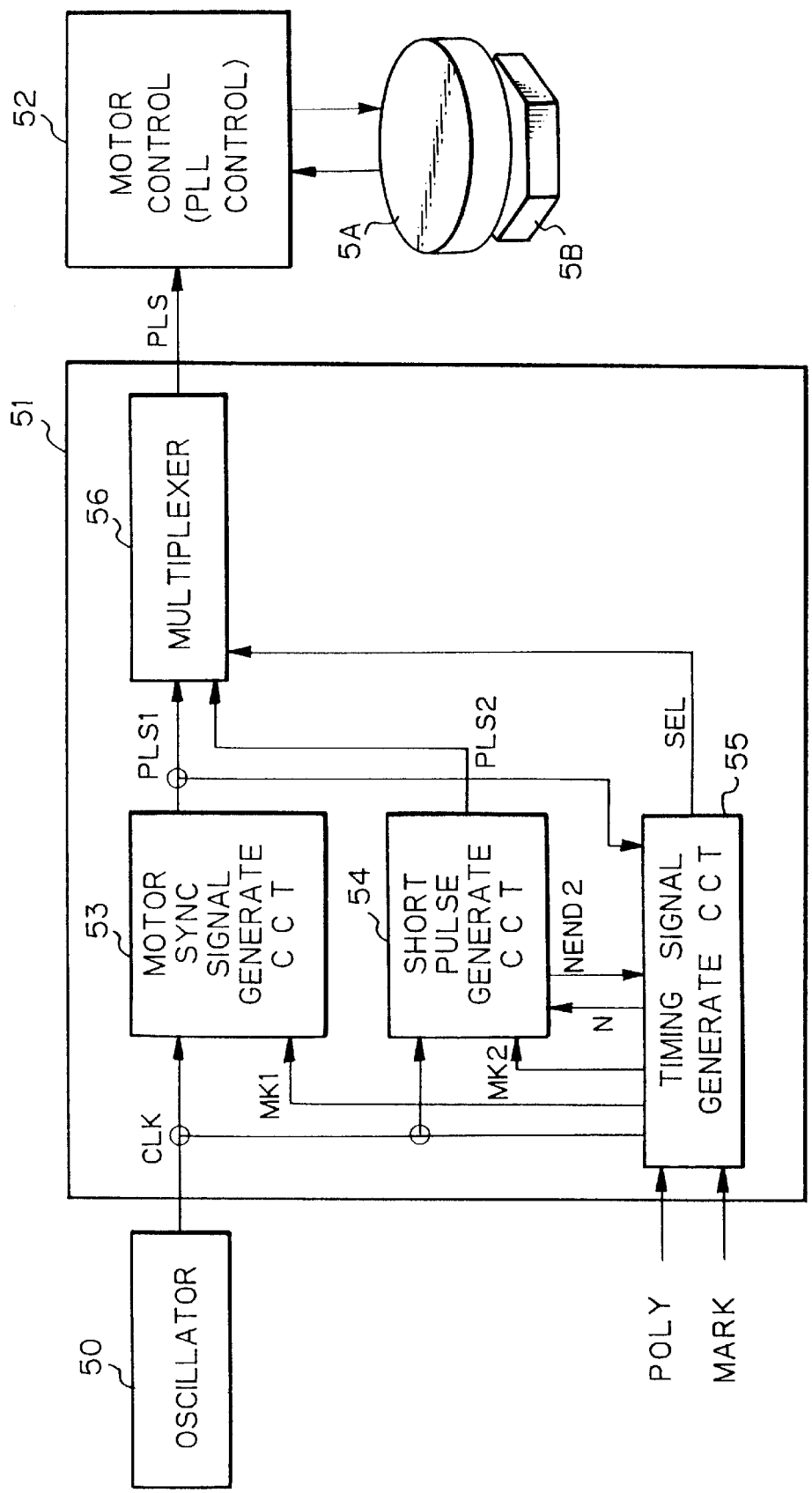
FIG. 33 is a block diagram schematically showing a phase matching section and a control section representative of a twelfth embodiment of the present invention.
Figure 34:
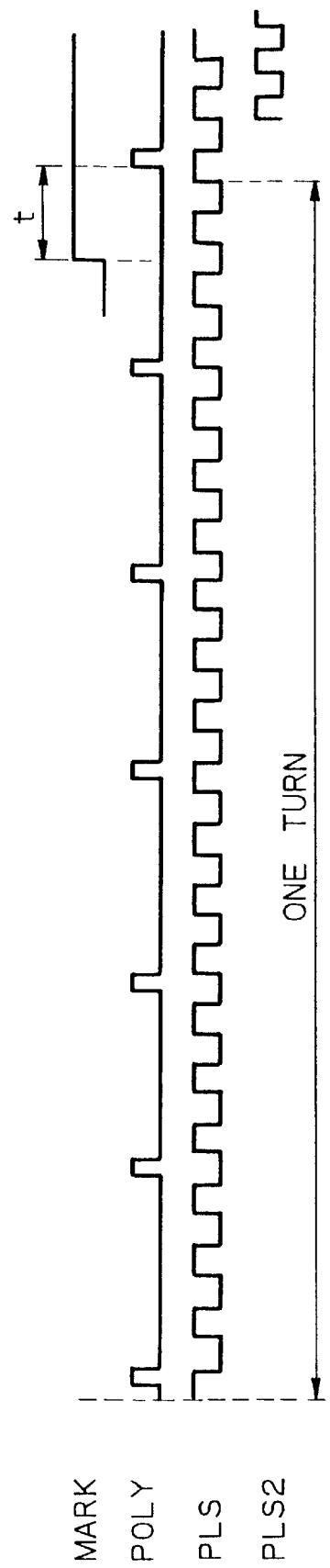
FIG. 34 is a timing chart demonstrating the operation of the twelfth embodiment.

FIG. 33 shows a twelfth embodiment of the present invention while FIG. 34 demonstrates the operation of the embodiment. As shown in FIG. 33, a sensor 5F is responsive to the synchronization of the mirror 5B and generates the synchronizing signal POLY. The signal POLY is applied to the timing signal generating circuit 55. In response, the circuit 55 determines a time difference between the signal POLY and the mark signal MARK and generates the short pulses PLS2 matching the difference.

13th Embodiment

Figure 35A:
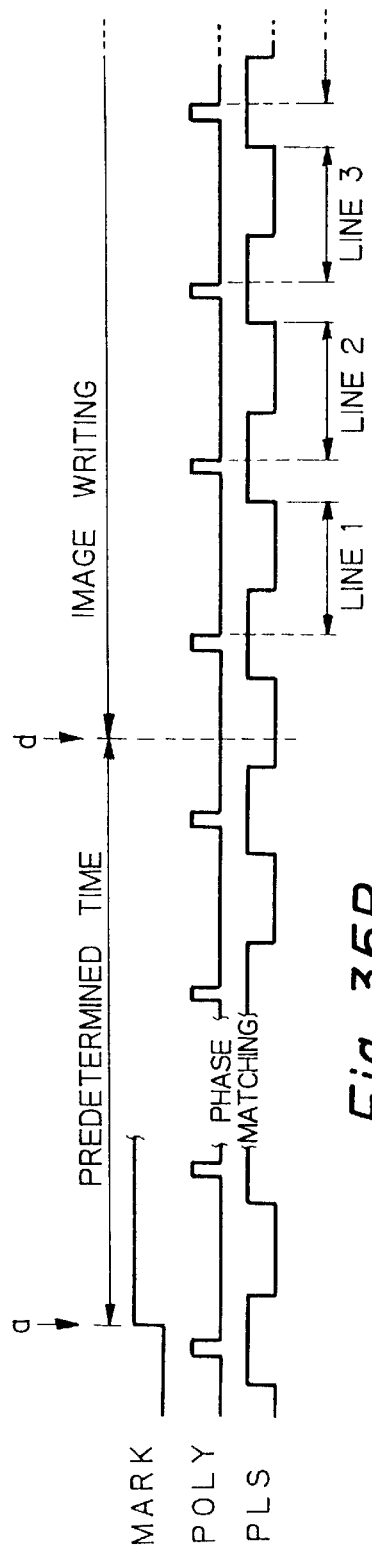
FIGS. 35A–35C are timing charts representative of a thirteenth embodiment of the present invention.
Figure 35B:
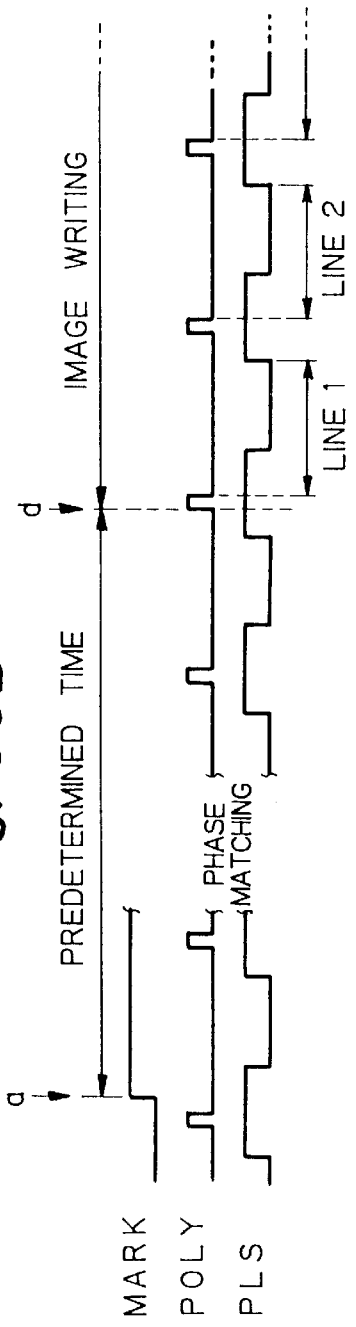
Figure 35C:
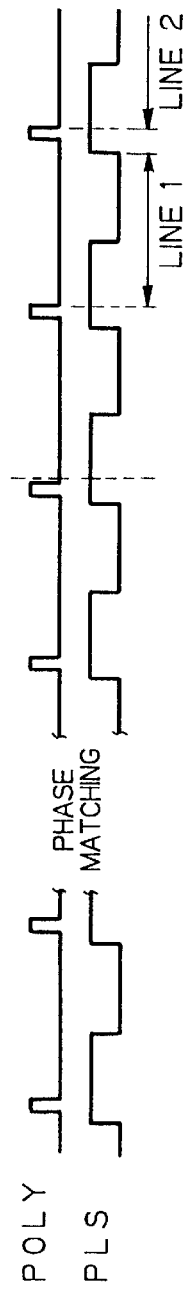

Referring to FIGS. 35A–35C, a thirteenth embodiment of the present invention will be described. The figures show an image writing timing. As shown, on the elapse of a predetermined period of time after the end of the phase matching period, image writing begins in synchronism with the signal POLY (d, FIGS. 35A–35C). The time d is representative of a predetermined period of time as counted from the detection of the mark. However, the motor 5A is not always assembled such that the phase coincides at all times when the motor 5A is mounted to the apparatus. This will not matter at all if the time d and signal POLY do not coincide, as shown in FIG. 35A. However, when the time d and signal POLY coincide, as shown in FIG. 35B, an image immediately begins to be written at the time d. Further, as shown in FIG. 35C, it may occur that the signal POLY appears before the time d. In this condition, even through the signal PLS may remain the same, as shown in FIGS. 35B and 35C, the writing line is delayed by one line due to the jitter of the motor 5A, making the phase shift meaningless.

To obviated the above occurrence, it is necessary to select the period of time (time d) as counted from the mark 41A–41F such that it does not coincide with the signal POLY. Then, the operation will occur at the timing shown in FIG. 35A at all times, making the phase shift significant.

Various modifications will become possible for those skilled in the art after receiving the teachings of the present disclosure without departing from the scope thereof.

What is claimed is:

1. A color image forming apparatus comprising:

an image carrier for causing a latent image to be electrostatically formed thereon;

emitting means for emitting a light beam modulated by each of image signals of respective colors and representative of a document image;

a rotatable polygonal mirror for steering said light beam to thereby electrostatically form latent images respectively associated with said image signals on said image carrier;

drive means for causing said polygonal mirror to rotate;

developing means for developing said latent images with developers of respective colors to thereby produce corresponding monocolor toner images;

an intermediate transfer body formed with a plurality of marks for position detection, and for causing said monocolor toner images to be sequentially transferred thereto from said image carrier;

sensing means located at a predetermined position for sensing said plurality of marks, and for generating an output in response to each sensed mark;

first control means for masking said output corresponding to each sensed mark except for a selected mark which remains an unmasked mark, and for causing each of said latent images to begin to be formed based on a time when said sensing means senses said unmasked mark; and second control means for controlling a rotation phase of said polygonal mirror on the basis of the time when said sensing means senses said unmasked mark and for ensuring said monocolor toner images overlap one another without relative displacement on said intermediate transfer body.

2. An apparatus as claimed in claim 1, wherein said sensing means comprises a reflection type photosensor.

3. An apparatus as claimed in claim 1, wherein said second control means changes a rotation phase matching period for said polygonal mirror on the basis of a deviation of the rotation phase of said polygonal mirror determined when said sensing means senses said unmasked mark.

4. An apparatus as claimed in claim 1, wherein said second control means changes the rotation phase of said polygonal mirror within a range not exceeding a phase control range particular to said drive means.

5. An apparatus as claimed in claim 1, wherein said second control means controls the rotation phase of said polygonal mirror in such a direction that said rotation phase runs after a target phase.

6. An apparatus as claimed in claim 1, wherein a rotation phase control period for said polygonal mirror consists of a phase difference detecting period and a phase matching period.

7. An apparatus as claimed in claim 1, wherein a reference signal for the rotation phase of said polygonal mirror comprises a pulse signal corresponding to a divisor of a number of faces of said polygonal mirror or one rotation.

8. An apparatus as claimed in claim 1, wherein said intermediate transfer body comprises a rotatable intermediate transfer belt.

9. An apparatus as claimed in claim 1, wherein said first control means causes each of said latent images to begin to be formed on the elapse of a predetermined period of time after said sensing means has sensed said unmasked mark.

10. An apparatus as claimed in claim 9, wherein said first control means counts reference signals for the rotation phase of said drive means, which starts oscillating when said sensing means senses said unmasked mark, to thereby control an interval between a sensing of said unmasked mark by said sensing means and a beginning of formation of the latent image.

11. An apparatus as claimed in claim 1, wherein said second control means controls the rotation phase of said polygonal mirror by retarding said rotation phase.

12. An apparatus as claimed in claim 1, wherein said drive means comprises a drive motor.

13. A color image forming apparatus comprising:

an image carrier configured to have electrostatically formed thereon latent images corresponding to respective colors of a document image;

a light source configured to emit a light beam modulated by image signals;

a rotatable polygonal mirror configured to steer said light beam in respective patterns to electrostatically form the latent images for said respective colors on said image carrier;

a drive mechanism configured to rotate said rotatable polygonal mirror;

a developer configured to apply respective developers to said latent images to produce corresponding monocolor toner images;

an intermediate transfer body having a plurality of marks formed thereon for position detection of a surface position of said intermediate transfer body when said monocolor toner images are sequentially transferred to said intermediate transfer body from said image carrier;

a sensor, positioned to oppose said plurality of marks on said intermediate transfer body so as to sense said plurality of marks when said intermediate transfer body passes said plurality of marks by said sensor and configured to generate an output in response to each sensed mark;

a first controller configured to mask said output corresponding to each sensed mark except for a selected mark which remains an unmasked mark, and to cause each of said latent images to begin to be formed based on a time when said sensor senses said unmasked mark; and a second controller configured to control a rotation phase of said polygonal mirror in coordination with the time when said sensor senses said unmasked mark, and for ensuring said monocolor toner images overlap one another without relative displacement on said intermediate transfer body, wherein said second controller switches a motor synchronization signal from a first signal to a second signal during a phase matching period, and subsequently switching said motor synchronization signal back to said first signal after said phase matching period is complete.

14. The apparatus of claim 13, wherein:
said unmasked sensor comprises a reflection type photosensor.

15. The apparatus of claim 13, wherein:
said second controller is configured to change the phase matching period for said polygon mirror by an amount corresponding to a deviation of the rotation phase of said polygonal mirror determined when said sensor senses said mark.

16. The apparatus of claim 13, wherein:
said second controller is configured to change the rotation phase of said polygonal mirror within a range not exceeding a phase control range particular to said drive mechanism.

17. The apparatus of claim 13, wherein:
said second controller is configured to control the rotation phase of said polygonal mirror in such a direction that said rotation phase runs after a target phase.

18. The apparatus of claim 13, wherein:
a rotation phase control period consists of a phase difference detecting period and a phase matching period.

19. The apparatus of claim 13, wherein:
the motor synchronization signal being a reference signal for the rotation phase of said polygonal mirror and comprises a pulse signal corresponding to divisor a number of faces of said polygonal mirror.

20. The apparatus of claim 13, wherein:
said intermediate transfer body comprises a rotatable intermediate transfer belt.

21. The apparatus of claim 13, wherein:
said first controller is configured to cause each of said latent images to begin to be formed a predetermined period of time elapses after said sensor has sensed the unmasked mark.

22. The apparatus of claim 21, wherein:
said first controller is configured to count reference signals for the rotation phase of the driving mechanism, which starts oscillating when said sensor senses the unmasked mark to control an interval between a sensing of said mark by said unmasked sensor and a beginning of formation of the latent image.

23. The apparatus of claim 13, wherein:
said second controller is configured to control a rotation phase of said polygonal mirror by retarding said rotation phase.

24. The apparatus of claim 13, wherein:
said drive mechanism comprises a drive motor.

25. An apparatus as claimed in claim 8, wherein said plurality of marks are formed on a sheet member affixed to said intermediate transfer belt.

26. An apparatus as claimed in claim 25, wherein said sheet member extends over an entire circumference of said intermediate transfer belt.

27. An apparatus as claimed in claim 26, wherein said sheet member is configured to reinforce said intermediate transfer belt.

28. An apparatus as claimed in claim 11, wherein said first control means initiates the forming of each latent image at a time corresponding to the elapse of a predetermined period of time after said unmasked mark is sensed and not corresponding to a time when a face of said polygonal mirror is detected.

29. An apparatus as claimed in claim 1, wherein said second control means selectively advances or retards the rotation phase of said polygonal mirror as a function of when said sensing means senses said unmasked mark.

30. An apparatus as claimed in claim 29, wherein said first control means initiates the forming of each latent image at a time corresponding to the elapse of a predetermined period of time after said unmasked mark is sensed and not corresponding to a time when a face of said polygonal mirror is detected.

31. An apparatus as claimed in claim 1, wherein said second control means matches the rotation phase rate of said polygonal mirror to a time constant of rotation control of said drive means.

32. An apparatus as claimed in claim 31, wherein said first control means initiates the forming of each latent image at a time corresponding to the elapse of a predetermined period of time after said unmasked mark is sensed and not corresponding to a time when a face of said polygonal mirror is detected.

33. An apparatus as claimed in claim 1, wherein a reference synchronizing signal input to said drive means has a period consisting of a number of pulses equal to a multiple of a number of faces of said polygonal mirror.

34. An apparatus as claimed in claim 33, wherein said first control means initiates the forming of each latent image at a time corresponding to the elapse of a predetermined period of time after said unmasked mark is sensed and not corresponding to a time when a face of said polygonal mirror is detected.

35. An apparatus as claimed in claim 12, wherein said second control means determines whether control over the rotation phase is accurate by detecting an encoder signal of said drive motor before and after the phase of said polygonal mirror is controlled.

36. An apparatus as claimed in claim 12, wherein said second control means controls the rotation phase of said polygonal mirror as a function of mark detection timing and a timing of an encoder signal of said drive motor.

37. An apparatus as claimed in claim 36, wherein said first control means initiates the forming of each latent image at a time corresponding to the elapse of a predetermined period of time after said unmasked mark is sensed and not corresponding to a time when a face of said polygonal mirror is detected.

38. An apparatus as claimed in claim 1, wherein said second control means controls the rotation phase of said polygonal mirror on the basis of a mark detection timing of two unmasked marks and a timing of a reference signal synchronous to a phase of rotation of faces of said polygonal mirror.

39. An apparatus as claimed in claim 38, wherein said first control means initiates the forming of each latent image at a time corresponding to the elapse of a predetermined period of time after said unmasked mark is sensed and not corresponding to a time when a face of said polygonal mirror is detected.

40. An apparatus as claimed in claim 1, wherein said second control means controls the rotation phase of said polygonal mirror on the basis of a mark detection timing of said sensing means and a timing of a face detection signal associated with said polygonal mirror.

41. An apparatus as claimed in claim 40, wherein said first control means initiates the forming of each latent image at a time corresponding to the elapse of a predetermined period of time after said unmasked mark is sensed and not corresponding to a time when a face of said polygonal is detected.

* * * * *

UNITED STATES PATENT AND TRADEMARK OFFICE
CERTIFICATE OF CORRECTION

PATENT NO. : 6,184,910 B1
DATED : February 6, 2001
INVENTOR(S) : Eiichi Sasaki et al.

It is certified that error appears in the above-identified patent and that said Letters Patent is hereby corrected as shown below:

Title page,
The CPA information has been omitted. It should read as follows:
-- [45] **Date of Patent: * Feb. 6, 2001**
[*] Notice: This patent issued on a continued prosecution application filed under 37 CFR 1.53(d), and is subject to the twenty year patent term provisions of 35 U.S.C. 154(a)(2) --

Signed and Sealed this

Sixteenth Day of April, 2002

Attest:

Attesting Officer

JAMES E. ROGAN
*Director of the United States Patent and Trademark Office*